United States Patent
Rodrigues et al.

(10) Patent No.: US 12,111,492 B2
(45) Date of Patent: Oct. 8, 2024

(54) ADAPTABLE OPTICAL NEURAL NETWORK SYSTEM

(71) Applicant: Toyota Motor Engineering & Manufacturing North America, Inc., Plano, TX (US)

(72) Inventors: Sean P. Rodrigues, Ann Arbor, MI (US); Paul Donald Schmalenberg, Ann Arbor, MI (US); Hideo Iizuka, Ann Arbor, MI (US); Jae Seung Lee, Ann Arbor, MI (US); Ercan Mehmet Dede, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 931 days.

(21) Appl. No.: 16/589,603

(22) Filed: Oct. 1, 2019

(65) Prior Publication Data
US 2021/0097378 A1    Apr. 1, 2021

(51) Int. Cl.
| | |
|---|---|
| G06N 3/044 | (2023.01) |
| G02B 6/12 | (2006.01) |
| G06F 18/24 | (2023.01) |
| G06N 3/04 | (2023.01) |
| G06N 3/048 | (2023.01) |
| G06N 3/067 | (2006.01) |
| G06V 10/82 | (2022.01) |

(52) U.S. Cl.
CPC ......... *G02B 6/12004* (2013.01); *G06F 18/24* (2023.01); *G06N 3/04* (2013.01); *G06N 3/067* (2013.01); *G06V 10/82* (2022.01)

(58) Field of Classification Search
CPC . G06N 3/067; G06N 3/04; G06N 3/08; G02B 6/12004; G02B 2006/12154; G02B 2006/12159; G06K 9/6267; G06V 10/82
See application file for complete search history.

(56) References Cited

U.S. PATENT DOCUMENTS

| | | |
|---|---|---|
| 10,078,791 B2 | 9/2018 | Justice et al. |
| 10,268,232 B2 | 4/2019 | Harris et al. |

(Continued)

OTHER PUBLICATIONS

Shen et al., "Deep Learning with Coherent Nanophotonic Circuits", arXiv:1610.02365v1 [physics.optics] Oct. 7, 2016.

(Continued)

*Primary Examiner* — Brandon S Cole
(74) *Attorney, Agent, or Firm* — Christopher G. Darrow; Darrow Mustafa PC

(57) ABSTRACT

Embodiments described herein relate to an adaptable photonic apparatus including an optical neural network. The photonic apparatus includes an optical input that provides an optical signal. The photonic apparatus also includes a chassis component and an optical neural network (ONN). The chassis component includes at least one modular mounting location for receiving a modular network component. The ONN is operably connected with the optical input and is configured to perform optical processing on the optical signal according to a deep learning algorithm. The ONN includes optical components arranged into layers to form the ONN. The modular network component is an additional optical processing component that is configured to function in cooperation with the ONN to adapt the deep learning algorithm.

16 Claims, 11 Drawing Sheets

(56) References Cited

U.S. PATENT DOCUMENTS

| | | | |
|---|---|---|---|
| 10,586,566 B1* | 3/2020 | Stafford | G11B 7/0065 |
| 2008/0008383 A1* | 1/2008 | Andel | G06K 9/00 |
| | | | 382/173 |
| 2017/0109628 A1* | 4/2017 | Gokmen | G06N 3/084 |
| 2017/0116515 A1 | 4/2017 | Abel et al. | |
| 2019/0223728 A1* | 7/2019 | Heidari | G06T 7/13 |
| 2019/0333198 A1* | 10/2019 | Wang | G06T 5/50 |
| 2019/0370652 A1* | 12/2019 | Shen | G06E 3/006 |

OTHER PUBLICATIONS

Mumbru et al., "Optically reconfigurable processors" Proceedings vol. 10296, 1999 Euro-American Workshop Optoelectronic Information Processing: A Critical Review; 102960D (1999) https://doi.org/10.1117/12.365910.

Zuo et al., "All Optical Neural Network with Nonlinear activation Functions", arXiv:1904.10819v1 [physics.optics] Apr. 24, 2019.

An et al., "A Novel Modeling Approach for All-Dielectric Metasurfaces Using Deep Neural Networks", arXiv:1906.03387 (Jun. 8, 2019).

Williamson et al., "Reprogrammable Electro-Optic Nonlinear Activation Functions for Optical Neural Networks", https://arxiv.org/pdf/1903.04579.pdf (Mar. 12, 2019).

Backer, "Computational inverse design for cascaded systems of metasurface optics", https://arxiv.org/abs/1906.10753 (Jun. 25, 2019).

Li et al., "Optical network for real-time face recognition" Appl. Opt. 32, 5026 (Sep. 10, 1993.

Shastri et al. "Principles of Neuromorphic Photonics", arXiv:1801.00016v1 [cs.ET] Dec. 29, 2017.

Tait et al., "Neuromorphic photonic networks using silicon photonic weight banks", Scientific Reports | 7: 7430 | DOI:10.1038/s41598-017-07754-z (Aug. 7, 2017).

Zhou et al., Self-learning photonic signal processor with an optical neural network chip, arXiv:1902.07318 (Feb. 18, 2019).

Tezak et al., "A Coherent Perceptron for All-Optical Learning", EPJ QuantumTechnology ( 2015) 2:10 DOI 10.1140/epjqt/s40507-015-0023-3.

He et al., "Deep Residual Learning for Image Recognition", arXiv:1512.03385v1 [cs.CV] Dec. 10, 2015.

Brunner et al. "All-optical neuromorphic computing in optical networks of semiconductor lasers", DOI: 10.1109/ICRC.2016.7738705 (Oct. 2016).

Caulfield, et al. Optical Neural Networks. Proceedings of the IEEE 77, 1573-1583 (1989).

Skinner,et al.,Optical neural network using Kerr-type nonlinear materials. in 12-15 (1994). doi: 10.1109/icmnn.1994.593141.

Brunner et al. "All-Optical Neuromorphic Computing in Optical Networks of Semiconductor Lasers", IEEE International Conference on Rebooting Computing (ICRC) (2016).

* cited by examiner

ADAPTABLE OPTICAL NEURAL NETWORK SYSTEM

TECHNICAL FIELD

The subject matter described herein relates in general to an optical neural network, and, more particularly, to an optical neural network having a novel configuration that provides for subsequent modification of processing tasks through selective adaptation of an architecture of the optical neural network using modular components.

BACKGROUND

Artificial neural network (ANNs) are computational models that attempt to mimic processing in the brain. For example, various forms of ANNs implement deep learning algorithms that perform speech recognition, image classification, and so on through the use of many separate nodes arranged in layers with interconnections that resemble the structure of neurons in the brain. Generally, an electronic computing device (e.g., a device having a von Neumann computing architecture) implements an ANN using a combination of complex data structures and functional routines to mimic this structure. A computing device executes the routines using a microprocessor or a task-specific processor such as a graphics processing unit (GPU). While such devices generally produce reliable results when executing deep learning algorithms, von Neumann architecture-based devices generally consume large amounts of energy when executing these computationally intensive tasks. Moreover, some deep learning tasks may require multiple processors or the use of a cloud-computing system in order to compute desired results within reasonable timeframes due to the complexity.

Another approach to implementing ANNs involves using optical processing components such as free space elements, interferometers, and so on to form an optical neural network (ONN). Optical neural networks are generally more efficient at performing deep learning tasks because light is intrinsically represented in the mathematical form of a matrix, which corresponds directly to a structure of the ONN. Thus, an ONN may be more efficient than a von Neumann computing architecture-based device because of the improved timing and power consumption of an ONN. However, ONNs are not generally reconfigurable. That is, while traditional computing devices implement ANNs using software and associated data structures that are generally reconfigurable or easy to replace, ONNs are hardware-based and typically operate using defined hardware elements having static connections therebetween. Thus, once fabricated, an ONN is generally limited to a defined neural network architecture. As such, updating the architecture of an ONN is generally not feasible thereby limiting an ONN to a particular approach as originally defined.

SUMMARY

An example of a photonic apparatus including a modular optical neural network and methods of operating the photonic apparatus are presented herein. In one approach, an apparatus is disclosed that provides an optical neural network in combination with additional components to permit subsequent adaptation of an architecture of the ONN thereby supporting updating or wholly changing a deep learning algorithm that the ONN implements. For example, in one embodiment, an apparatus includes an ONN having multiple different layers forming an architecture of the ONN. The separate layers generally include various optical components that may include Mach-Zehnder interferometers, free space elements, grating couplers, fiber optic bundles, and/or other optical components that provide for processing the optical signal.

Accordingly, the ONN performs a particular task or class of tasks that the hardware configuration of the ONN can support. In general, the tasks may include object detection and classification, and generally relate to a particular type of input data (i.e., the optical signal) such as LiDAR point clouds. In addition to the ONN, the apparatus includes a chassis component. The chassis component, in one embodiment, supports the ONN and also provides one or more modular mounting locations. The modular mounting locations, in one embodiment, are spaces within the apparatus that are initially free (i.e., do not include optical processing components) but can support additional processing components as may be added subsequently. For example, in various implementations, the chassis component provides mounting locations prior to the ONN, in parallel with the ONN, after the ONN, and even between existing layers of the ONN.

The mounting locations within the chassis component, when unoccupied, provide for propagating the optical signal as needed between various components such as between layers of the ONN, to an input of the ONN, from an output of the ONN, etc. Thus, the mounting locations support directing the optical signal between the components as needed. As such, when an update to the apparatus inserts a modular network component into the chassis component, the chassis component provides for appropriately directing the optical signal between the modular network component and the ONN. The modular network component itself can generally include any optical component and/or arrangement of multiple components as may operate on the same optical signal as the ONN. In various approaches, the modular network component may comprise a whole separate optical neural network, layers of an optical neural network, or simply a single optical component.

As previously indicated, the inclusion of the modular network component with the existing ONN generally functions to adapt the processing of the existing ONN to form a revised version of an implemented deep learning algorithm. It should be appreciated that depending on the particular nature of the update, the revised version may encompass processing of the optical signal according to multiple separate ONNs, processing according to an updated architecture embodied by the existing ONN and the modular network components, and so on. In any case, the arrangement of the chassis component and the ONN to accept modular network components provides a robust configuration of an optical processing apparatus that improves the adaptability of the ONN to accept subsequent modifications.

In one embodiment, an apparatus is disclosed. The apparatus includes an optical input that provides an optical signal. The apparatus includes a chassis component including at least one modular mounting location for receiving a modular network component. The apparatus includes an optical neural network (ONN) operably connected with the optical input. The ONN is configured to perform optical processing on the optical signal according to a deep learning algorithm. The ONN includes optical components arranged into layers to form the ONN. The modular network component is an additional optical processing component that is configured to function in cooperation with the ONN to adapt the deep learning algorithm.

In one embodiment, an optical processing apparatus is disclosed. The optical processing apparatus includes an optical input that provides an optical signal from an optical sensor that produces the optical signal as a direct observation of a surrounding environment. The optical processing apparatus includes an optical neural network (ONN) operably connected with the optical input and configured to perform optical processing on the optical signal according to a deep learning algorithm. The ONN includes optical components arranged into layers to form the ONN. The optical processing apparatus includes a chassis component including at least one modular mounting location. The optical processing apparatus a modular network component mounted in the at least one modular mounting location. The modular network component and the ONN function together to implement a revised version of the deep learning algorithm.

In one embodiment, a method for adapting an optical neural network (ONN) is disclosed. The method includes providing the ONN to execute a deep learning algorithm on an optical signal. Providing the ONN includes mounting the ONN into a chassis and operably connecting the ONN with an optical input that provides the optical signal. The method includes initializing the ONN by setting hyper-parameters for separate nodes with layers of the ONN. The method includes processing the optical signal to provide classification results.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
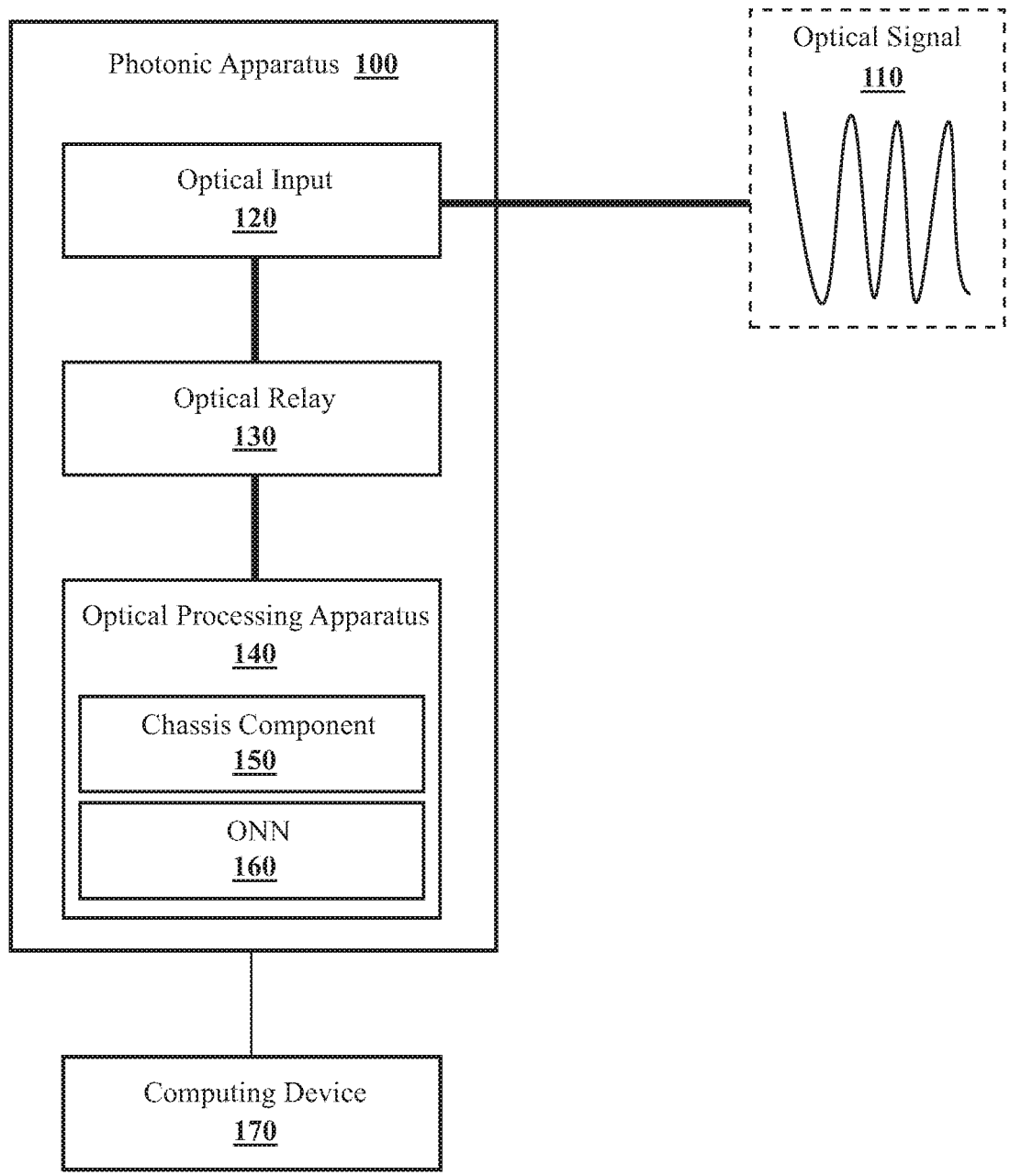
FIG. 1 is a block diagram illustrating one embodiment of a photonic apparatus associated with an optical processing apparatus including adaptable components.

Systems, methods, and other embodiments associated with a modular optical processing apparatus are presented herein. As previously noted, optical neural networks (ONNs) generally provide performance advantages over electronically-based neural networks implemented on von Neumann computing-architectures in relation to power consumption and, in some respects, processing throughput. However, because ONNs are generally hardware-based, and have a static architecture, updating an ONN is generally limited to retraining an existing architecture where feasible. As such, ONNs may suffer from an inability to modify an internal architecture after deployment, and, thus, are not generally adaptable to implementing updated deep learning algorithms as may be desirable.

In one approach, an optical processing apparatus is disclosed that provides an optical neural network in combination with a modular chassis component that permits subsequent adaptation of an architecture of the ONN. By providing the ONN in configuration with the modular chassis component, the optical processing apparatus supports updating a deep learning algorithm that the ONN implements. For example, in one embodiment, the ONN has an architecture that includes multiple different layers of optical processing components. The various optical components may include sets of Mach-Zehnder interferometers, free space elements, grating couplers, fiber optic bundles, and/or other optical components or combinations of the noted components that provide for processing the optical signal according to a deep learning algorithm. Accordingly, the ONN performs a particular task or class of tasks that the hardware configuration of the ONN can support. In general, the tasks may include tasks such as object detection and classification, feature detection, voice recognition, and are generally set up for a particular type of input data such as LiDAR point clouds, image sources, or other optical data.

In addition to the ONN, the apparatus includes a chassis component. The chassis component, in one embodiment, supports the ONN and also provides one or more modular mounting locations. The modular mounting locations, in one embodiment, are spaces within the apparatus that are initially free (i.e., do not include optical processing components) but can support additional processing components as may be added subsequently. For example, in various implementations, the chassis component provides mounting locations prior to the ONN, in parallel with the ONN, after the ONN, and even between existing layers of the ONN. The mounting locations within the chassis component, when unoccupied, provide for propagating the optical signal as needed between various components such as between layers of the ONN, to an input of the ONN, from an output of the ONN, etc. In one embodiment, the mounting locations provide for free space propagation of optical signals when no modular component is present. In alternative arrangements, the mounting locations provide optical waveguides, fiber optics, or other suitable communication media for propagating the optical signal between an optical input and the ONN.

Thus, the mounting locations support directing the optical signal between the components as needed. When an update to the apparatus inserts a modular network component into the chassis component, the chassis component provides connections for mounting the component and also optical pathways for appropriately directing the optical signal between the modular network component and the ONN. Accordingly, the mounting location provides options for upgrading the ONN at a subsequent point in time while permitting the ONN to function seamlessly while the mounting locations remain empty.

The modular network component itself is, in one or more approaches, any optical component and/or arrangement of multiple components as may operate on the same optical signal as the ONN. In various approaches, the modular network component may comprise a standalone optical neural network, one or more layers of an optical neural network, or simply a single optical component. As previously indicated, the inclusion of the modular network component with the existing ONN generally functions to adapt the processing of the existing ONN to form a revised version of an implemented deep learning algorithm. It should be appreciated that depending on the particular nature of the update (e.g., between layers, before/after, parallel), the revised version may encompass processing of the optical signal according to multiple separate ONNs, processing according to an updated architecture embodied by the existing ONN and the modular network components, and so on. In any case, the arrangement of the chassis component and the ONN to accept modular network components provides a robust configuration of an optical processing apparatus that improves the adaptability of the ONN to accept subsequent modifications thereby overcoming difficulties with hardware-based optical neural networks.

Referring to FIG. 1, an example of a photonic apparatus 100 is illustrated. The photonic apparatus of FIG. 1 is shown in relation to an optical signal 110 that is, for example, reflected light embodying an observation of a surrounding environment as an optical sensor may observe, an optical communication encoding information from a separate device (e.g., a separate computing component with a datacenter), and so on. More generally, the optical signal 110 as used herein is intended to embody any optical signal upon which an optical neural network may operate. Moreover, while the present disclosure generally references the optical signal 110 in a singular discrete form, it should be appreciated that the optical signal 110 may include a plurality of separate discrete optical signals that are, for example, conveyed over separate optical pathways and/or via separate optical inputs to an optical neural network.

The disclosed photonic apparatus 100 is generally discussed as being implemented along with electronic devices such as robots, vehicles, and so on to perform various perception tasks; however, it should be appreciated that the disclosed apparatus, devices, etc. can be integrated with the noted machines or can be provided as standalone components. While arrangements may be described herein with respect to automobiles, it will be understood that embodiments are not limited to automobiles. Additionally, it should be noted that the photonic apparatus 100 is, in one embodiment, comprised of chip-scale silicon photonic devices. That is, in one approach, one or more of the components embodied in the photonic apparatus 100 are silicon photonic components provided in the form of a complementary metal-oxide-semiconductor (CMOS) compatible silicon-on-insulator-based chips that may also include electronic control circuitry.

The photonic apparatus 100 also includes various elements. It will be understood that, in various embodiments, it may not be necessary for the photonic apparatus 100 to have all of the elements shown in FIG. 1. The photonic apparatus 100 can have any combination of the various elements shown in FIG. 1. Further, the photonic apparatus 100 can have additional elements to those shown in FIG. 1. In some arrangements, the photonic apparatus 100 may be implemented without one or more of the elements shown in FIG. 1. Further, while the various elements are shown as being located within the photonic apparatus 100 in FIG. 1, it will be understood that one or more of these elements can be located external to the photonic apparatus 100. Further, the elements shown may be physically separated by varying distances.

Additionally, it will be appreciated that for simplicity and clarity of illustration, where appropriate, reference numerals have been repeated among the different figures to indicate corresponding or analogous elements. The present discussion outlines numerous, specific details to provide a thorough understanding of the embodiments described herein. Those of skill in the art, however, will understand that the embodiments described herein may be practiced using various combinations of these elements.

In any case, the photonic apparatus 100 includes, in one embodiment, an optical input 120, an optical relay 130, and an optical processing apparatus 140. In one embodiment, the optical processing apparatus 140 is a sub-component of the photonic apparatus 100, and is generally defined by the chassis component 150, which may house an optical neural network (ONN) 160 or the ONN 160 may be separate from the chassis component 150. In either case, the chassis component 150 permits the subsequent addition or swapping of optical components to adapt a deep learning algorithm implemented by the ONN 160, as will be discussed in greater detail subsequently.

Returning to the optical input 120, in one embodiment, the optical input 120 relays the optical signal 110 from an optical sensor such as a light detection and ranging (LiDAR) sensor, from an optical network interface, or from another optical source into the optical processing apparatus 140. In the instance of a LiDAR sensor providing the optical signal 110, the signal 110 generally represents observations of a surrounding environment of an associated device that houses the photonic apparatus 100 and the LiDAR sensor such as a vehicle. The optical signal 110 generally originates from a laser or other light source associated with an emitter of the LiDAR. Accordingly, a wavelength and other characteristics of the optical signal 110 can be controlled either dynamically or as a particular aspect of implementation. As a further matter, it should be noted that reference to optical signals, light waves, and light all generally refer to electromagnetic radiation having a particular wavelength. For example, as discussed herein the optical signal 110 is infrared light (e.g., 935 nm, 1550 nm), or another suitable wavelength (e.g., in the visible spectrum). In further aspects, the particular wavelength of light may be varied according to particular aspects of the implementation. Moreover, the LiDAR sensor may also control other characteristics (e.g., phase) of the optical signal 110. In further aspects where the source of the optical signal 110 is an optical network interface, characteristics of the optical signal 110 may be similarly defined according to the originating device, and the optical signal 110 may separately encode information such as images (e.g., gesture recognition, driver/passenger recognition), sound (e.g., in the case of voice/word recognition), 3D representations of environments (e.g., point clouds/LiDAR), and so on.

In a further aspect, the photonic apparatus 100 and the source of the optical signal 110 are integrated together in a single device through which the optical signal 110 propagates over an integrated optical pathway. Accordingly, the optical input 120 maintains the optical signal 110 as an analog light wave as represented by the darkened connections between the various components. In one embodiment, the optical input 120 provides the optical signal 110 to an optical relay 130 prior to the optical processing apparatus 140. The optical relay 130 may take different forms depending on, for example, a wavelength of light associated with the source of the optical signal 110, a particular platform on which the photonic apparatus 100 is to be deployed, and so on. In either case, the optical relay 130 may include different components depending on an implementation.

Figure 2:
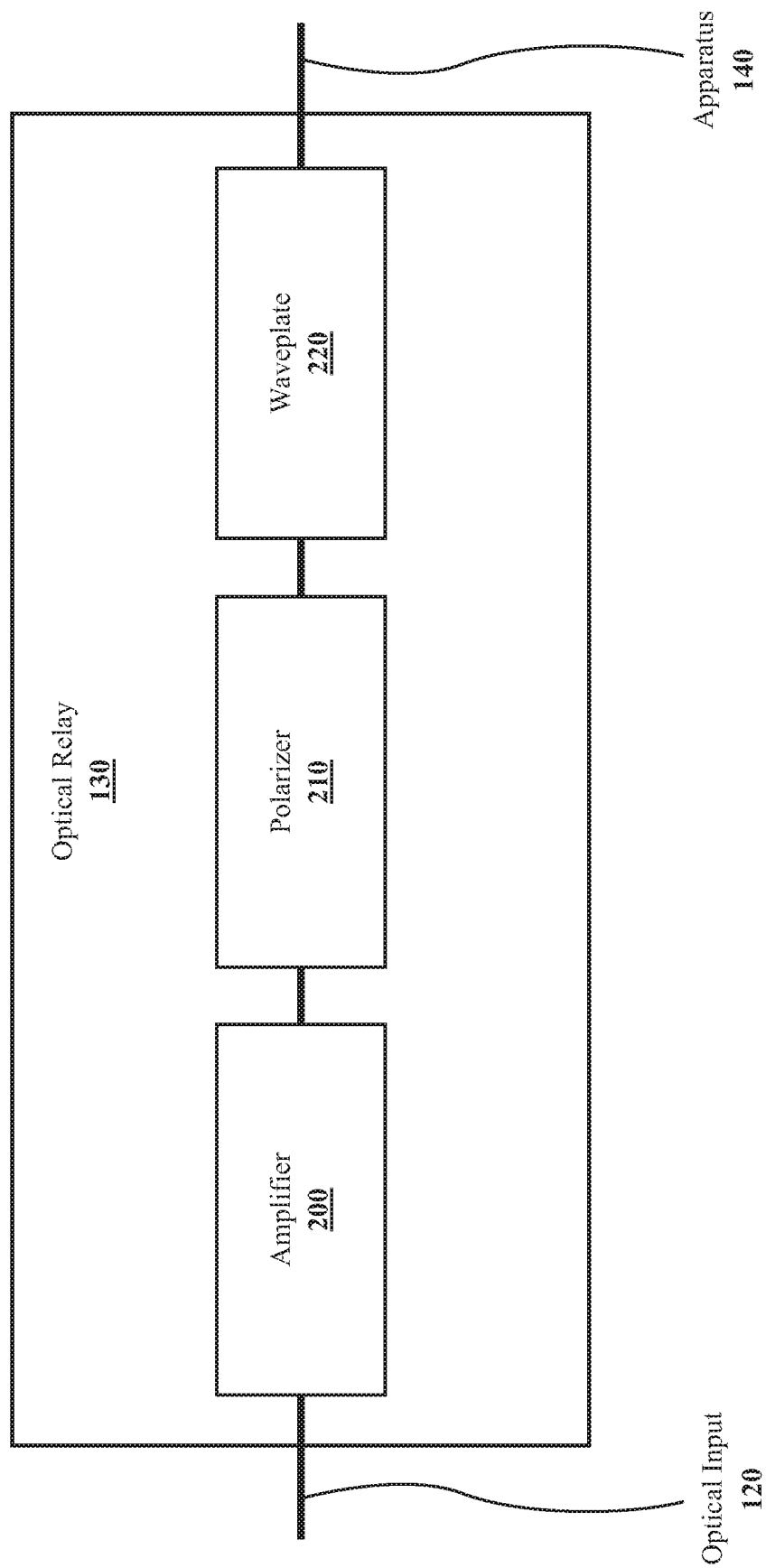
FIG. 2 is a diagram illustrating one embodiment of an optical relay.

FIG. 2 illustrates one embodiment of the optical relay 130. As illustrated in FIG. 2, the optical relay 130 is connected with the optical input 120 via an optical fiber, silicon photonic waveguide, or another suitable optical pathway. Similarly, the optical relay 130 provides the optical signal 110 or an adapted form thereof to the processing apparatus 140 and the optical neural network 160 therein via an optical fiber, silicon photonic waveguide, or another suitable optical pathway including optical pathways supported by the chassis component 150 for subsequent adaptation. In either case, the optical relay 130 itself includes, in one embodiment, an amplifier 200, a polarizer 210, and a waveplate 220.

As noted previously, because the ONN 160 and/or other components that may be included within the optical processing apparatus 140 may operate, for example, more efficiently/accurately on a signal that has been conditioned to have particular characteristics, the amplifier 200 boosts the optical signal in order to provide a signal into the ONN 160 having an improved amplitude. The polarizer 210 filters the optical signal to condition the optical signal 110 to have a consistent polarization, and the waveplate 220 adapts the optical signal 110 from the polarizer 210 such that an output of the optical relay 130 has a specific selected polarization as may be optimal for processing by the ONN 160. Accordingly, the optical relay 130 functions to adapt the optical signal 110 for subsequent processing by the ONN 160 or another optical processing component. Of course, in alternative arrangements, the photonic apparatus 100 may omit the optical relay 130 and provide the optical signal 110 directly between the optical input 120 and the optical processing apparatus 140. For example, when the incoming optical signal 110 generally has characteristics that are within operating tolerances of the optical processing apparatus 140, the signal 110 may be provided to the optical processing apparatus 140 without any pre-processing by the optical relay 130.

As such, continuing with FIG. 1, the optical neural network (ONN) 160 receives the optical signal 110, in one or more arrangements, from the optical relay 130 and processes the optical signal 110 according to an architecture of the ONN 160. That is, the architecture of the ONN 160 is generally configured in, for example, a static manner according to an arrangement of physical components forming nodes and layers. The physical components forming the ONN 160 can include optical components such as couplers, phase shifters, optical gratings, waveguides, etc. Thus, as opposed to a software-based neural network that may execute on an electronic processor, and that is generally reconfigurable according to adaptations to the software/data structures, the architecture of the ONN 160 is generally pre-defined and the base structure of the ONN 160 is, in at least one approach, fixed since the ONN 160 is embodied within various hardware elements. Moreover, the ONN 160 may be arranged in layers with the separate layers including optical components and successive layers being interconnected to form, for example, partially and/or fully connected layers.

Separate control circuitry (not illustrated) of the photonic apparatus 100 dynamically configures weights (i.e., hyper-parameters) of different nodes (e.g., phase shifters) within the ONN 160 according to a training process or through predefined values. The ONN 160 is generally configured for a particular task with a particular arrangement of components to suit that task, however, the weighting of the internal elements can be adjusted according to training on different sets of information. By way of example, the ONN 160 may be configured for a machine learning algorithm that is for object classification. Thus, depending on a particular implementation, the ONN 160 may be trained on different classes of objects. That is, in a transportation context, the ONN 160 would be trained to identify vehicles, pedestrians, traffic signs, and so on. By contrast, the same ONN 160 may be separately trained on indoor objects such as furniture, stairs, etc. when implemented as part of a robotic device that functions within an indoor context. The different training on different classes of objects results in, for example, different internal weights (also referred to as hyper-parameters) that generally control transmission efficiency at different nodes in the ONN 160.

For example, in one approach, the ONN 160 is trained by adapting values of phase shifters at different layers and nodes in the ONN 160. The training process may parallel a supervised learning process that uses pre-labeled analog optical data to provide for comparing results generated by the ONN 160 with known values of the pre-labeled data. In one approach, the photonic apparatus 100 further includes control circuitry (not illustrated) that actively controls the various phase shifters to adjust the hyper-parameters according to training results (e.g., comparison of results with known labels via a loss function).

For example, the control circuitry can tune the phase shifters to provide a particular phase change using thermo-optic controls, electro-optic controls, phase-change materials, 2D materials, and/or microelectromechanical-optic controls (MEMs-optic). In other words, in one approach, the control circuitry functions to control a heater (not illustrated) to produce a particular amount of thermal energy, and provide the thermal energy to the phase shifters. Because an amount of phase shift induced within the optical signals propagating through the phase shifters can be controlled as a function of a present temperature, the control circuitry controls the heater to provide thermal energy according to an amount of phase change that is desired. Furthermore, in additional aspects, the control circuitry can control the phase shifters to adjust the refractive index using an electro-optic control. Thus, the control circuitry can control the phase shifter to adjust the phase change within the phase shifters (e.g., optical waveguides, liquid crystal phase shifters, etc.) in different ways depending on the particular implementation. In this way, the photonic apparatus 100 can train the ONN 160 to perform various machine perception tasks.

However, the actual architecture of the ONN 160 is generally not capable of being directly adapted. Thus, while the ONN 160 may be trained to identify separate classes of objects using the same underlying architecture, the deep learning algorithm embodied by the architecture does not change. As such, as updates in the deep learning algorithm are derived, such updates are not generally capable of being integrated into the ONN 160 when the ONN 160 is statically defined in hardware. Consequently, the chassis component 150 provides an opportunity to update the actual architecture of the ONN 160 through the subsequent inclusion of additional optical components. That is, for example, modular network components can be inserted into the chassis component, in various arrangements, in order to modify the existing architecture of the ONN 160.

The chassis component 150, as previously noted, includes various mechanisms for propagating the optical signal 110 from the input 120 to the ONN 160 when no modular network components are present. The mechanisms can include blank metasurfaces, free space, waveguides, optical fibers, and so on. Thus, inserting the modular network elements can include replacing the noted mechanisms and/or reconfiguring the mechanisms to direct the optical signal 110 into the modular network components. In further aspects, the modular network components replace the components. For example, a transparent metasurface (e.g., a surface without etched components) that simply propagates the optical signal 110 to the ONN 160 may be replaced with a metasurface that includes laser engraved/etched optical elements. In further examples, other diffractive optical elements in the form of photonic crystals (PCs), grating structures with waveplates, and so on may be mounted into the chassis component 150.

It should be appreciated that the particular form of the modular network components may vary depending on an extent of the modification to the architecture of the ONN 160. For example, the various components may be provided in different combinations to form additional layers that add to the ONN 160, thereby modifying an architecture of the ONN 160 itself. In a further example, the modular network component may form a completely separate optical neural network that functions in parallel with the ONN 160 and provides additional separate classifications that support the primary classification of the ONN 160. In yet a further approach, the modular network components may be arranged to provide further pre or post-processing on the optical signal 110. Moreover, in still a further approach, the control circuitry may virtually modify the architecture of the ONN 160 itself by selectively disabling nodes within the ONN 160. That is, the control circuitry may adjust values of nodes to prevent the transmission of the optical signal 110 through a particular set of nodes thereby effectively deactivating a particular region of the ONN 160. This selective deactivation of nodes/regions within the ONN 160 may be used independently or in combination with the addition of the modular network components to adapt the architecture of the ONN 160, and, thus, the deep learning algorithm embodied in the apparatus 140.

As a general note about the optical signal 110 in relation to the ONN 160, it should be appreciated that the optical signal 110, as originally provided into the optical processing apparatus 140 and as may be present at an output of the ONN 160, is generally of a significantly different character but is broadly referred to as the optical signal 110 for purposes of simplicity of this discussion. In any case, as will be discussed in greater detail subsequently, the modular network components may be placed prior to the ONN 160, in parallel with the ONN 160, after the ONN 160, between optical components of the ONN 160 itself, and/or some combination of the various options. In this way, the chassis component 150 provides mounting locations to accept the modular network components in order to adapt/update the ONN 160 subsequently.

In any case, the photonic apparatus 100 functions to acquire and process the optical signal 110 and provide a result of the processing (e.g., labels of identified objects, planned path, etc.) to a computing device 170. Consequently, the ONN 160 can further include photoreceivers at an output layer that convert the result produced by the ONN 160 into an electronic form for subsequent processing by the computing device 170. Accordingly, the chassis component 150, in one or more approaches, may provide mounting locations prior to the photoreceivers in order to provide for inserting modular network components after the primary processing layers of the ONN 160 and prior to conversion of the optical signals 110 by the photoreceivers. Thus, the photonic apparatus 100 maintains the optical signal 110 as an analog optical signal throughout an optical pathway including reception in the apparatus 100 and processing of the optical signal 110 by the ONN 160 and any potentially inserted modular network components.

As will be outlined subsequently, the computing device 170 is, in one or more embodiments, an electronic processor (e.g., CPU, GPU, ASIC, etc.) executing one or more modules of instructions as part of a datacenter server or, alternatively, as an edge computing device. Thus, the functionality may be varied according to the particular implementation but may include functions in support of autonomous control of a vehicle or other robotic device. Thus, the results provided by the photonic apparatus 100 in regards to observations of the surrounding environment may facilitate obstacle detection/avoidance, path planning, and other functions in support of autonomous control of the vehicle. In further aspects, the photonic apparatus 100 is integrated with as an edge computing device within a semi-autonomous system or an advanced driving assistance system (ADAS) of a vehicle to provide perceptions about the surrounding environment. In one or more approaches, the photonic apparatus 100 is integrated as a perception device within a drone (e.g., an aerial drone).

In still further aspects, the photonic apparatus 100/computing device 170 are statically mounted on a utility pole at an intersection, along a highway, as a surveillance device mounted to a building, or otherwise as a static device. Thus, the photonic apparatus 100 may be separately implemented to perform functions such as motion detection, intrusion detection, facial recognition, voice recognition, roadway monitoring, and so on. In general, the photonic apparatus 100 may be implemented in various circumstances to exploit the noted advantages such as in edge computing devices to realize improved performance through increased efficiency in both power consumption and processing throughput. Moreover, as also noted, the photonic apparatus 100 may be implemented within the context of a data center as a rack-mounted device to provide adaptable optical neural networks for various applications.

Figure 3:
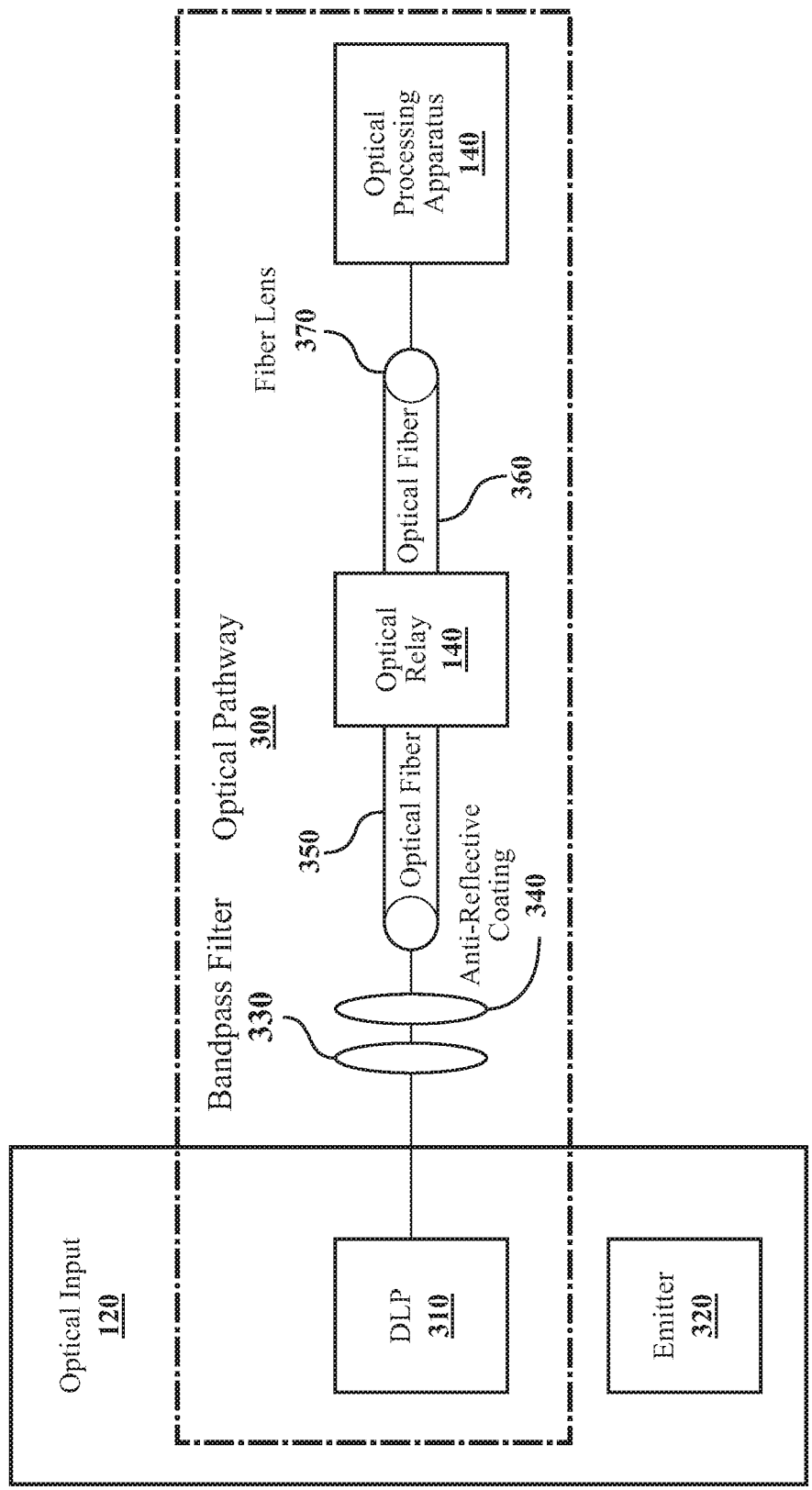
FIG. 3 is a block diagram illustrating one embodiment of an integrated optical pathway.

With reference to FIG. 3, one embodiment of an optical pathway 300 as may be implemented in combination with elements of FIG. 1 is further illustrated. As shown in FIG. 3, the optical pathway 300 is an example shown for a single emitter of the optical input 120 (e.g., LiDAR sensor). The optical pathway 300 is effectively a detector of the optical sensor with built-in processing capabilities. Accordingly, the optical input 120 is illustrated in combination with the LiDAR sensor as including a digital light processor (DLP) 310 and a single emitter 320. It should be appreciated that in implementation, the LiDAR sensor may include multiple sets (e.g., 8, 32, 64, etc.) of emitters 320 and/or DLPs 310, which generally translate into multiple separate subcomponents of the optical signal 110 provided via the optical input 120. In either case, the emitter 320 generates and transmits the optical signal 110 into the surrounding environment. As previously mentioned, the emitter 320 can produce the optical signal 110 with defined characteristics such as wavelength, phase, and so on.

The LiDAR sensor may alternatively implement the DLP 310 as a separate type of light processor that is embedded in the optical fiber as an electro-optic switch, fiber modulator, etc. In one approach, the DLP 310 is alternatively a spatial light modulator in conjunction with a polarizer, a Pockel's cell, an electro-optic modulator (EOM) (e.g., an electro-optic crystal), or another suitable gating mechanism that focuses (e.g., switches) reception to actively time the provided optical signal 110. Furthermore, the DLP 310, in one or more embodiments, is a DLP array that operates on all inputs into the photonic apparatus 100. The DLP 310 receives the reflected optical signal 110 and provides the optical signal 110 to a set of optics including the optical relay 130. In general, the DLP 310 functions as a gating mechanism to clock reception of the optical signal 110 in coordination with transmission of the optical signal 110 by the emitter 320 such that the DLP 310 permits the reflected optical signal 110 to enter the optical pathway 300 while excluding other ambient noise/signals.

In either case, the LiDAR provides the optical signal 110 that is gated according to transmission by the emitter 320 to subsequent components within the optical pathway 300. As illustrated in FIG. 3, the optical pathway 300 can include one or more intervening optics between the DLP 310 and the optical relay 130. For example, as illustrated, the optical pathway 300 includes a bandpass filter 330 and a lens or other optic with an anti-reflective coating 340. In one embodiment, the bandpass filter 330 performs additional conditioning on the optical signal 110 to filter noise from the optical signals while the lens and coating 340 generally function to pass the optical signal 110 into optical fiber 350. The optical fiber 350 maintains the optical pathway 300 into the optical relay 130, which further adapts the optical signal 110 as discussed previously in relation to FIG. 2. An output of the optical relay 130 is connected with an additional optical fiber 360 that guides the optical signal 110 into the optical processing apparatus 140 via a fiber lens 370.

The chassis component 150 within the processing apparatus 140, in one approach, provides at least one mounting location prior to the ONN 160 that permits for subsequent insertion of modular network components that can include additional conditioning components such as further filters, lenses, waveplates, and so on.

The connection between the optical fiber 360 and the apparatus 140 may be a fiber to silicon photonics waveguide transition, a fiber-to-fiber connection, a tapered waveguide, or another suitable pathway that maintains the optical signal 110 as an analog optical signal and that is generally dependent on an implementation of the ONN 160 (e.g., photonic integrated circuit (PIC), fiber bundle, etc.) and/or the apparatus 140. The ONN 160, in one arrangement, performs optical processing on the optical signal 110 according to a deep learning algorithm by using optical components. Thus, the ONN 160 can include, in one or more arrangements, a photonic integrated circuit (PIC), a fiber optic bundle, a set of optical gratings (e.g., multiple groove gratings), a set of optical free space elements, a set of beam splitters, a set of phase shifters (e.g., liquid crystal phase shifters, electro-optic phase shifters, etc.), an array/mesh of Mach-Zehnder interferometers, and so on.

In general, the ONN 160 can include a combination of the noted elements in particular arrangements to achieve the functionality of artificial neural networks (ANNs) such as convolutional neural networks, recurrent neural networks, long short-term memory (LSTM) networks, autoencoder networks, deconvolutional networks, support vector machines (SVMs), and so on. Moreover, the ONN 160 generally provides an output (i.e., result) of processing to a photoreceiver/detector to perform optical to electrical conversion of the result. Subsequently, the apparatus 100 can use the result to modify operation of the ONN 160 and/or cause a response to various environmental occurrences based, at least part, on the result.

Figure 4:
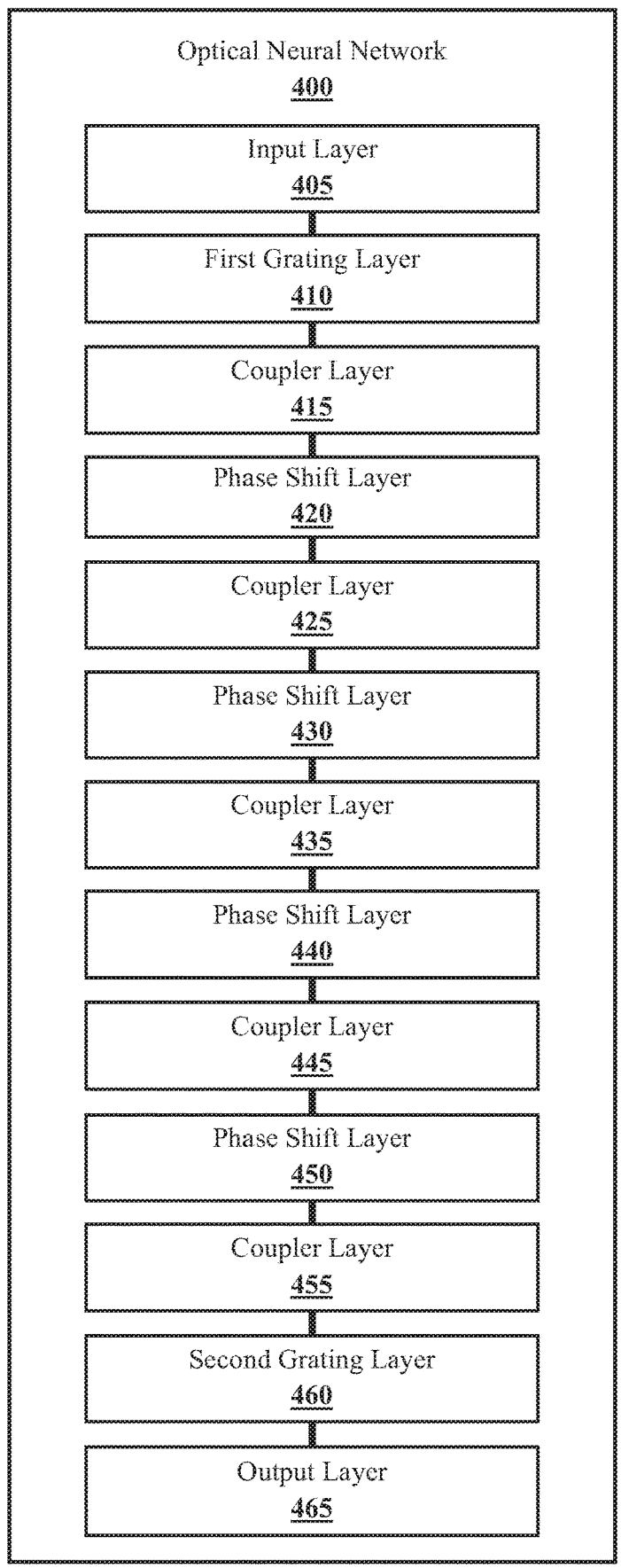
FIG. 4 is a diagram illustrating one embodiment of an optical neural network.

As one example of an implementation of the ONN 160, consider FIG. 4, which illustrates an optical neural network 400. As illustrated, the ONN 400 includes multiple different layers. In general, the ONN 400 includes two general types of layers. That is, the ONN 400 includes signal handling layers for directing the optical signal 110 within the ONN 400, and optical processing layers for implementing a deep learning algorithm to process the optical signal 110.

The signal handling layers include input layer 405, output layer 465, and grating layers 410 and 460. The input layer 405 includes optical elements such as optical fibers, silicon photonic waveguides, and/or other optical components that direct the optical signal 110 into the ONN 400. In one embodiment, the input layer 405 includes a defined set of inputs that separately correspond with input channels from the optical input 120. For example, in one approach, the input layer 405 includes eight distinct inputs corresponding with, for example, separate channels of the optical input 120. Similarly, the output layer 465 can include outputs that correspond to the inputs. Moreover, the output layer 465 may additionally include a photodetector/receiver that receives a result of layers within the ONN 400 processing the optical signal 110 and converts the optical signal into an electronic form.

Moreover, while the separate layers of the ONN 400 are illustrated as being adjacent without spacing for mounting locations of the chassis component 150 in which an update may insert subsequent modular network components, in one or more embodiments, the layers of the ONN 400 are spaced to accommodate additional layers being inserted therebetween or to accommodate separate components that provide for redirecting the optical signal 110 out of the progression of layers to further components mounted in the chassis component 150 and, in one or more embodiments, back into ONN 400 at an original point of redirection. In this way, the chassis component 150 can support the ONN 400 and provide for multiple separate options for subsequently upgrading the ONN 400. In yet a further option, the chassis component 150 removably mounts the layers of the ONN 400 so that selected layers may be swapped out to update the ONN 400. That is, the different layers may be provided as sheets of metasurfaces, photonic crystals, etc. that may be selectively removed and then replaced with updated components.

In any case, the signal handling layers further include a first grating layer 410 and a second grating layer 460. The grating layers 410 and 460 are positioned within the ONN 400 to control a direction in which the optical signal 110 propagates. For example, the grating layers 410 and 460 include sets of optical gratings. In one approach, the layers 410 and 460 include a separate set of gratings for each of the input/output channels. The gratings that form the layers 410 and 460 are, in one embodiment, $TiO_2$ double-groove gratings attached on top of a semi-infinite $SiO_2$ substrate. In one approach, the double groove of the gratings in the grating layers 410 and 460 have two different widths per period. The two different widths are configured such that the layers 410 and 460 specifically direct the separate channels of the optical signal 110 onto elements of subsequent layers (e.g., couplers and/or outputs). Moreover, the double groove gratings of the layers 410 and 460 are configured to provide transmission of the optical signal 110 with high efficiency (e.g., greater than 90%) and at an angle that facilitates incidence upon a subsequent component.

Accordingly, the grating layers 410 and 460 generally direct the optical signal 110 (e.g., 935 nm wavelength) to a subsequent layer and in an efficient manner. The coupler layers 415, 425, 435, 445, and 455 generally alternate with the phase shift layers 420, 430, 440, and 450. The coupler layers and the phase shift layers function in combination to implement the deep learning algorithm. Moreover, the coupler layers 415, 425, 435, 445, and 455 include, in one or more embodiments, optical grating couplers that are binary dielectric transmission gratings having defined groove parameters that control, at least in part, a transmission efficiency of the optical signal 110 that is incident upon the grating couplers. Additionally, the particular transmission efficiency of the gratings is further dependent on an angle of incidence of the optical signal 110 on the gratings. Accordingly, by varying the noted design parameters and/or the angle of incidence of the optical signal 110 on the respective couplers, the ONN 400 can vary a transmission efficiency of the particular coupler, which effectively functions to adapt weights of the various nodes in the ONN 400 for implementing training of the ONN 400 according to a particular machine learning algorithm and set of training data. In one embodiment, the design parameters of the grating couplers can include groove depth and width for a rectangular grating geometry. Accordingly, depending on a selection of groove parameters, the grating couplers can be provided with a varied transmission efficiency.

In a further aspect, the coupler layers 415, 425, 435, 445, and 455 include double groove gratings at edges of the layers to re-direct the optical signal 110 back into the ONN 400 instead of permitting a portion of the optical signal 110 to stray outwardly from an edge. That is, the coupler layers can include one set of double-groove gratings at each edge (e.g., a far-right edge and a far-left edge) to retain a portion of the light that is directed toward the edges within the ONN 400. Alternatively, the coupler layers can implement a binary gating, which is a specific ridge-height, at edges of the layers to achieve this function Additionally, it should be appreciated that space within the ONN 400 that is between the layers/components is generally free space (i.e., air) whereas the particular optical components are formed from silicon or a silicon-based material, various selections of metals, plastics, and so on. The phase shift layers 420, 430, 440, and 450 include, in one or more embodiments, sets of liquid crystal phase shifters or other suitable phase shifters that shift separate outputs of the coupler layers 415, 425, 435, 445 prior to the outputs re-converging on subsequent layers. In various approaches, a number of phase shifters per layer may vary depending on, for example, a number of inputs and an order within layers of the ONN 400. In one example, the coupler layers include three or four separate couplers with alternate coupler layers also including the noted double groove gratings for redirecting the light at the edges. As a general matter, the phase shifters within the layers 420, 430, 440, and 450 function to selectively adapt phases of optical signals propagating therein such that adapting the phases according to known values can alter transmission efficiencies of the coupler layers 425, 435, 445, and 455. In this way, the combination of various layers functions to implement a deep learning algorithm.

As an additional note, to support the ability of the chassis component 150 to provide intra-layer mounting locations, the ONN 400, in one embodiment, includes a particular arrangement of coupler layers and/or grating layers about an inter-layer mounting location. As will become further evident upon discussion of FIG. 5, the various layers provide particular diffraction angles that direct the optical signal 110 within the ONN 400 between separate optical components such as between coupler layers and phase shifters. Thus, the particular arrangement of components in a layer and between layers can be a specifically designed aspect of this particular type of optical neural network.

As such, simply leaving additional space between the layers/optical components may not be sufficient, in some instances, to support inclusion of the intra-layer mounting locations. Consequently, in one or more arrangements, the ONN 400 includes additional sets of grating layers prior to and after an inter-layer mounting location to provide direct propagation of the optical signal 110 across the mounting location or into a modular network component that may be inserted into the mounting location. Accordingly, a design of the ONN 400 may be provided to facilitate subsequent updates.

Figure 5:
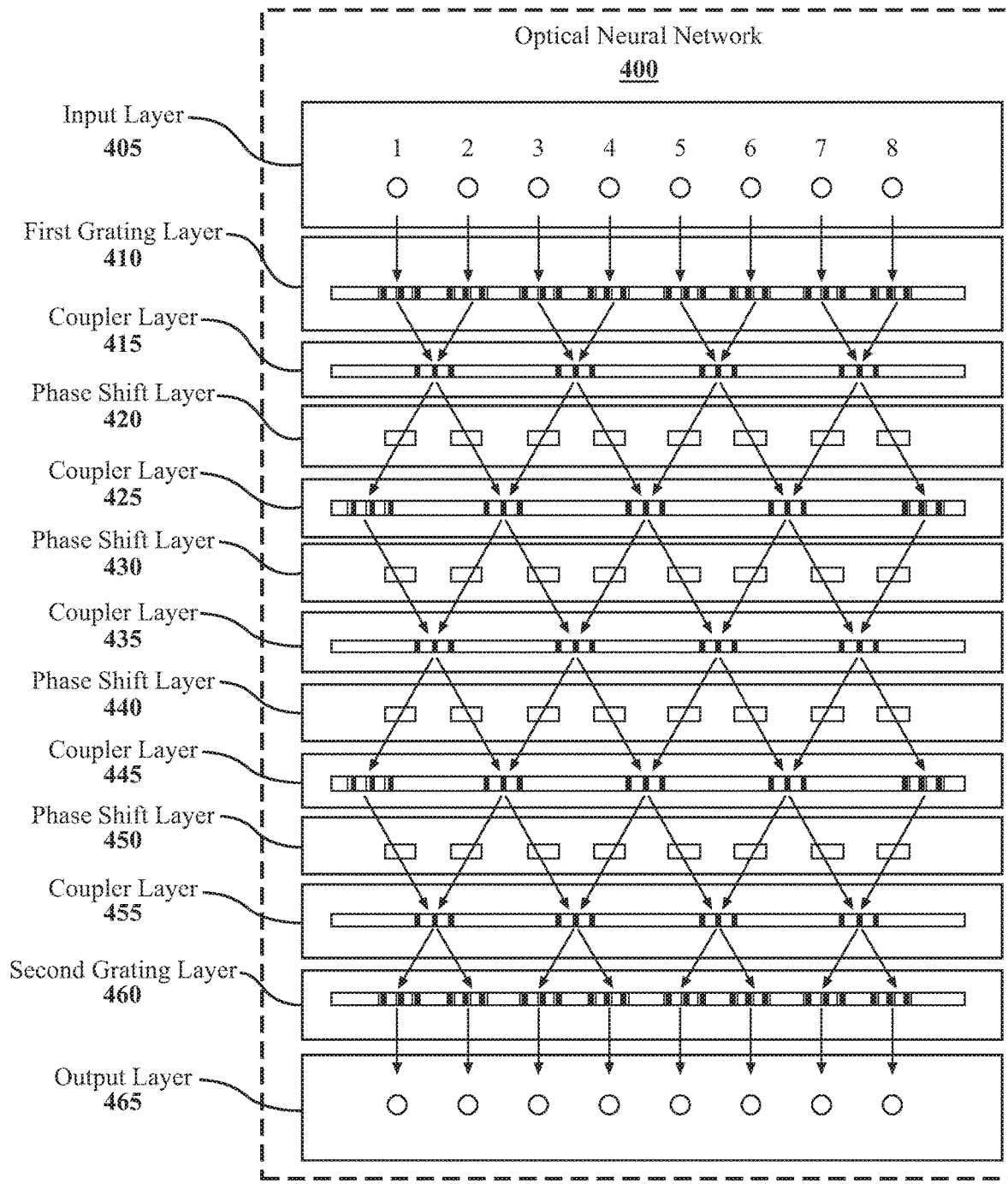
FIG. 5 illustrates one example of an architecture for an optical neural network that uses a combination of gratings and phase shifters.

FIG. 5 illustrates one implementation of the optical neural network 400 of FIG. 4. As shown in FIG. 5 the separate layers are populated with the previously noted optical components in a particular arrangement to achieve a deep learning architecture. As illustrated in FIG. 5, the ONN 400 includes eight inputs corresponding with inputs of the optical input 120. Additionally, the grating layers 410 and 460 include a corresponding number of double-groove gratings with different widths. As shown, the grating layers 410 and 460 provide for specifically controlling the propagation of the optical signal 110 to or from particular optical components of various layers. Thus, as noted in relation to the inter-layer mounting locations, a specific arrangement between layers may include an additional instance of layer 460 receiving the optical signal 110 and directing the signal 110 across a space of the mounting location (or into a mounted modular component) to an additional instance of layer 410 that functions to re-introduce the signal to a subsequent layer of the ONN 400.

The coupler layers 425 and 445 further include the double-groove gratings at boundary positions along the edges for redirecting the light back into the ONN 400 and also include optical grating couplers positioned therebetween. The coupler layers 415, 435, and 455 further include sets of the optical grating couplers having a form as previously noted. The phase shift layers 420, 430, 440, and 450 include respective sets of phase shifters. It should be appreciated that while the various layers are shown with a specific number of optical components, the number of optical components may vary according to a number of inputs for an implementation. As an additional note, the optical signal 110 propagating through the ONN 400 as illustrated in FIG. 5 is represented by the lines with arrows indicating a direction of propagation and is generally of a particular wavelength such as, for example, 935 nm.

Figure 6:
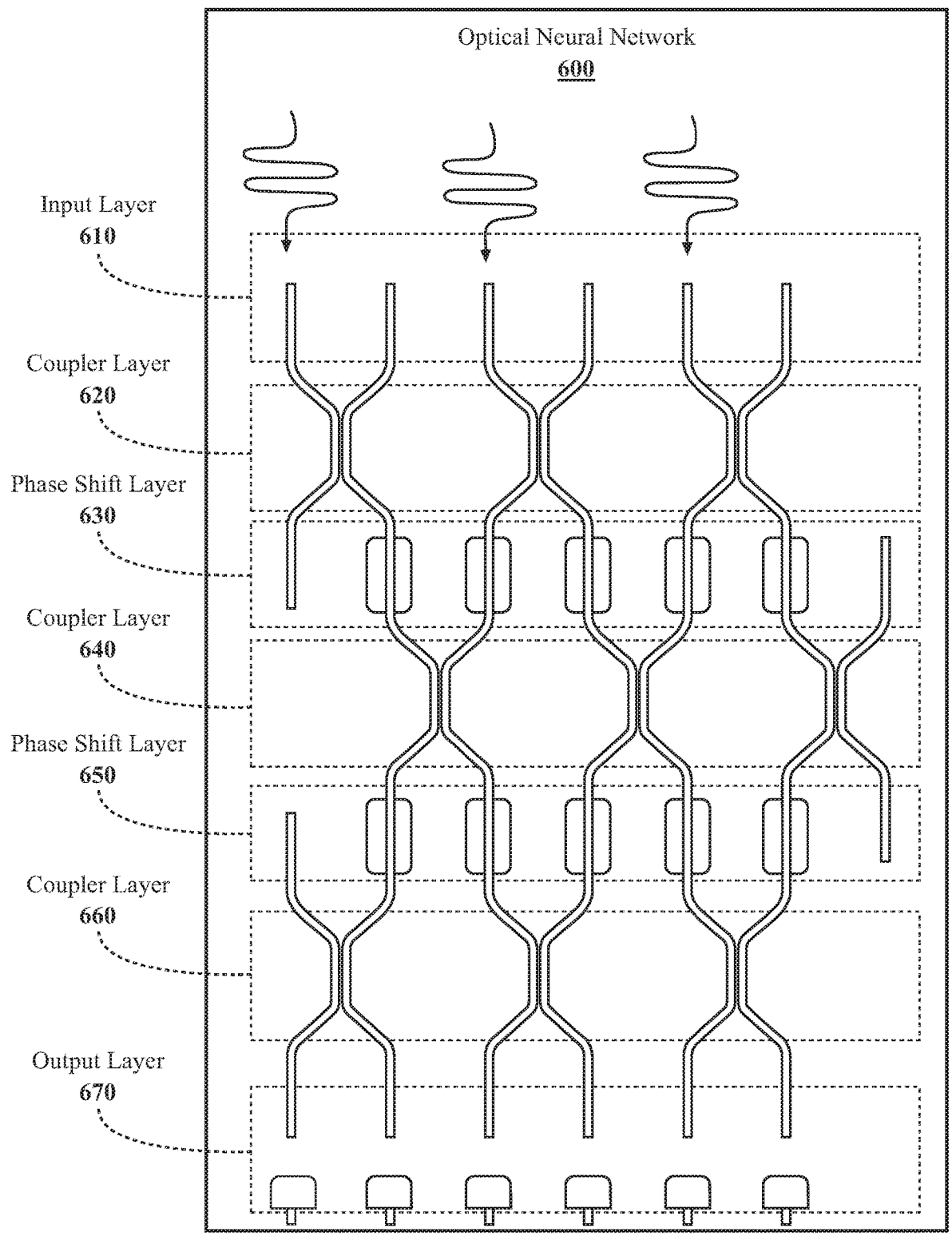
FIG. 6 illustrates an additional example architecture for an optical neural network.

FIG. 6 illustrates a further embodiment of an ONN 600 as may be implemented within the optical pathway 300. As an initial note, the ONN 600, as shown in FIG. 6, is an illustrative embodiment of an ONN that uses the noted components and is not a comprehensive diagram. That is, as illustrated, the ONN 600 is missing one or more connections and/or components but generally embodies the format of such a configuration. Accordingly, the ONN 600 includes a collection of alternating layers similar to the layers of the ONN 400. However, the ONN 600 is not comprised of free space with optical elements but instead includes silicon-photonic waveguides formed into layers of couplers and phase shifters that form a mesh of Mach-Zehnder interferometers.

As shown, the ONN 600 includes an input layer 610, coupler layers 620, 640, 660, phase shift layers 630, 650, and an output layer 670. In general, the input layer 610 receives the optical signal 110 (e.g., 1550 nm) from the optical relay 130 and provides the optical signal 110 into the ONN 600. The coupler layers 620 are, for example, evanescently coupled silicon photonic waveguides that function to couple light being propagated therein but also to split the optical signal 110 between subsequent branches. Thus, the couplers also act as beam splitters to form the mesh of Mach-Zehnder interferometers. In general, the mesh of Mach-Zehnder interferometers is repetitively formed from the beam splitters/couplers, and the phase shifters with each unit including at least, for example, two beam splitters and two-phase shifters. However, because of the interlinked nature of the architecture, as shown in FIG. 6, the mesh of Mach-Zehnder interferometers (MZIs) may not include distinct Mach-Zehnder interferometers but rather the noted mesh/concatenated set of interferometers where components are shared. In various approaches, the particular architecture may vary and include differing numbers of MZIs.

The phase shift layers 630 and 650 include electro-optic phase shifters and/or thermo-optic phase shifters formed about the waveguides. In one embodiment, the phase shifters within the various phase shift layers 630 and 650 are generally adjustable to vary weights, which affect interference of the optical signal 110 at different couplers/splitters thereby selectively transmitting the optical signal 110 via different nodes to implement the deep learning algorithm. Of course, in further approaches, the ONN 600 may include additional alternating layers and varied arrangements of the optical elements within the layers. The noted components are configured to generally function to decompose unitary matrix operations into sets of phase shifters and beam splitters and perform matrix multiplications by manipulating splitting ratios to add or remove light relative to a baseline.

The output layer 670, as illustrated, includes photoreceivers that ultimately convert the result produced by the ONN 600 into an electronic form for subsequent use by an electronic computing device. In one or more embodiments, the computing device (e.g., device 160) includes an electronic processor operably connected with the output layer 670 to acquire the result in the electronic form (e.g., as electrical signals encoding digital bits). In any case, in a similar fashion as discussed in relation to the ONN 400 of FIGS. 4 and 5, the chassis component 150, in one or more embodiments, provides inter-layer mounting locations for accepting modular network components between layers of the ONN 600. Thus, in the instance of the ONN 600, one or more layers are, for example, provided in a manner that permits changes in connections between the layers as part of the inter-layer mounting location. For example, in one approach, as opposed to the inter-layer mounting location accepting actual additional components between layers in the ONN 600, the connections between the separate layers (e.g., layers 640 and 650) are configured with optical switches (not shown). The optical switches, when active, generally function to redirect the optical signal 110 from, for example, an output of the layer 640 to a modular network component. The optical switch may provide for re-injecting the optical signal 110 after processing by the modular network component to a subsequent layer (e.g., layer 650).

In further approaches, the ONN 600 is embodied within separate photonic integrated circuits (PICs) such that, for example, a first portion (e.g., layers 610-640) is embodied on a first chip while a second portion (e.g., layers 650-670) is embodied on a second chip with modular connections and/or switches therebetween to form the inter-layer mounting location and accept modular network components. Thus, the presently disclosed configuration of the chassis component 150 and the ONN 160/600, provides for a modular architecture that may be adapted after deployment to ensure a deep learning algorithm implemented therein can be subsequently revised.

In any case, the computing device 170, in one embodiment, is configured to receive converted results from the ONN 160/400/600. The computing device 170 generally includes a memory communicably coupled to the electronic processor and storing a module that includes instructions when executed by the electronic processor cause the electronic processor to control a vehicle according to the result. That is, the computing device 170 may be a controller within a vehicle that uses inputs from the photonic apparatus 100 to compute decisions about trajectories or other control functions for a vehicle. Accordingly, the photonic apparatus 100, as disclosed herein, illustrates how an optical perception/sensing and processing pathway are integrated into a single device without performing intermediate conversion to an electronic format. Thus, the disclosed optical pathway provides a continuous and uninterrupted pathway for the propagation of optical signals that not only receives the reflected light from the surrounding environment but also processes the optical signals in an original format thereby improving throughput while also conserving energy to provide machine perception processing over the sensor data and within a mobile/edge computing device. Therefore, as vehicle systems advance, adaptations to the ONN 160 may be desired in order to further refine and improve the functioning of the photonic apparatus 100.

Figure 7:
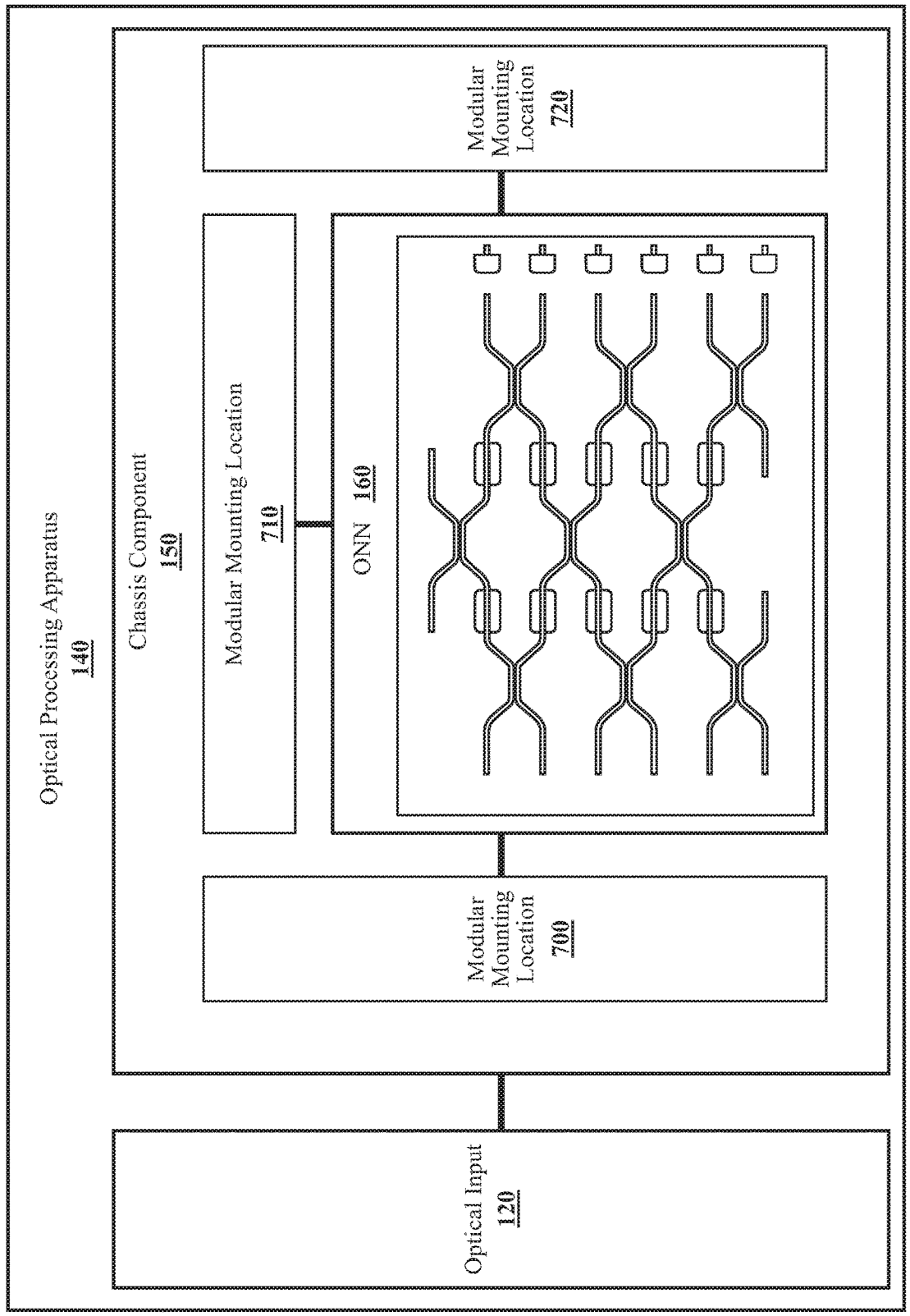
FIG. 7 illustrates an embodiment of an optical processing apparatus including a chassis component with modular mounting locations.

Accordingly, with reference to FIG. 7, one embodiment of the optical processing apparatus 140 is further illustrated that provides various options for subsequently adapting optical processing components included in the optical processing apparatus 140. As shown, the chassis component 150 includes three separate modular mounting locations 700, 710, and 720. FIG. 7 illustrates the three mounting locations 700, 710, and 720 as examples of how the mounting locations may be arranged to support modular network components receiving the optical signal 110 in various configurations and are not intended as an exhaustive listing of how the modular mounting locations may be arranged. For example, each separate location 700, 710, and 720 are shown as discrete blocks but may include, in one or more embodiments, a plurality of separate locations with each separate block. Moreover, in one or more embodiments, the chassis component 150 may include fewer available positions of the modular mounting locations.

For example, as illustrated in FIG. 7, the chassis component 150 includes three separate positions. The modular mounting location 700 is a pre-ONN position. Thus, the location 700, in one embodiment, intervenes between the ONN 160 and the optical input 120. Accordingly, the modular mounting location 700 provides for inserting components prior to the ONN 160 to provide processing of the optical signal 110 prior to the ONN 160 receiving the signal 110. Thus, when one or more modular network components are included before the ONN 160, the ONN 160 receives a partially processed optical signal 110 (e.g., plurality of split optical signals processed by the modular component(s))

upon which the ONN 160 may further operate to implement a revised version of the deep learning algorithm.

FIG. 7 further illustrates the modular mounting location 710 that is in parallel with the ONN 160. Thus, in general, inserting modular network components in location 710 results in such components receiving the optical signal 110 separate from and in parallel to the ONN 160. In various configurations, providing a modular network component in parallel can include providing an additional self-contained optical neural network that provides a separate classification of the optical signal 110 in comparison to the ONN 160 (e.g., an additional supplemental classification in comparison with the ONN 160).

In a further aspect, in place of providing the modular network component in the parallel location 710 as a separate optical neural network, the modular network component placed in location 710 may function to provide the optical signal 110 in a residual form (i.e., unprocessed) to a modular network component in location 720. Thus, in this particular arrangement, the modular network component inserted into location 710 may function to delay the optical signal 110 for further components in location 720 while components in location 720 may receive both the residual form (e.g., unprocessed by ONN 160) and a processed form (e.g., processed by 160) of the optical signal 110. In this way, the various mounting locations can be used independently or in combination to adapt an architecture of the ONN 160 and form the revised version of the deep learning algorithm.

The mounting location 720 is post/after the ONN 160. In one embodiment, the modular mounting location 720 includes connections for receiving the optical signal in a processed form from the ONN 160, via the mounting locations 700/710 in an unprocessed or partially processed form, or from both. Thus, inserting a modular network component into the location 720 generally provides for performing, in one embodiment, post-processing or additional processing of the optical signal 110, which generally depends on the type of modular network components inserted into location 720 and whether components are also inserted into the other locations 700/710.

As previously described, a modular network component, in various embodiments, may take different forms. For example, a complexity of the modular network component may vary from a simple diffractive element (e.g., photonic crystal, metasurface, grating, etc.) to combinations of the elements arranged into a neural network layer, and beyond to multiple layers and/or a full separate optical neural network. Moreover, a particular configuration of the modular network components may also vary depending on the implementation. That is, in one approach, the implementation (i.e., a type of the optical components) may mirror existing components that form the ONN 160. For example, where the ONN 160 is comprised of a mesh of MZIs, the modular network component may also include further layers of the mesh or components that complement the MZIs.

Alternatively, the modular network components may take a different form than a type of component embodied in the ONN 160 such as free space optical components in contrast to an ONN formed from a mesh of MZIs. Similarly, where the ONN 160 is formed from free space elements, the modular network components inserted as part of an upgrade may take the form of more structured components such as MZIs comprised of waveguides. In either case, the chassis component 150 generally provides a robust mechanism upon which many different combinations of modular network components can be inserted to provide for updating the existing ONN 160 to implement a revised version of the deep learning algorithm implemented therein.

Figure 8:
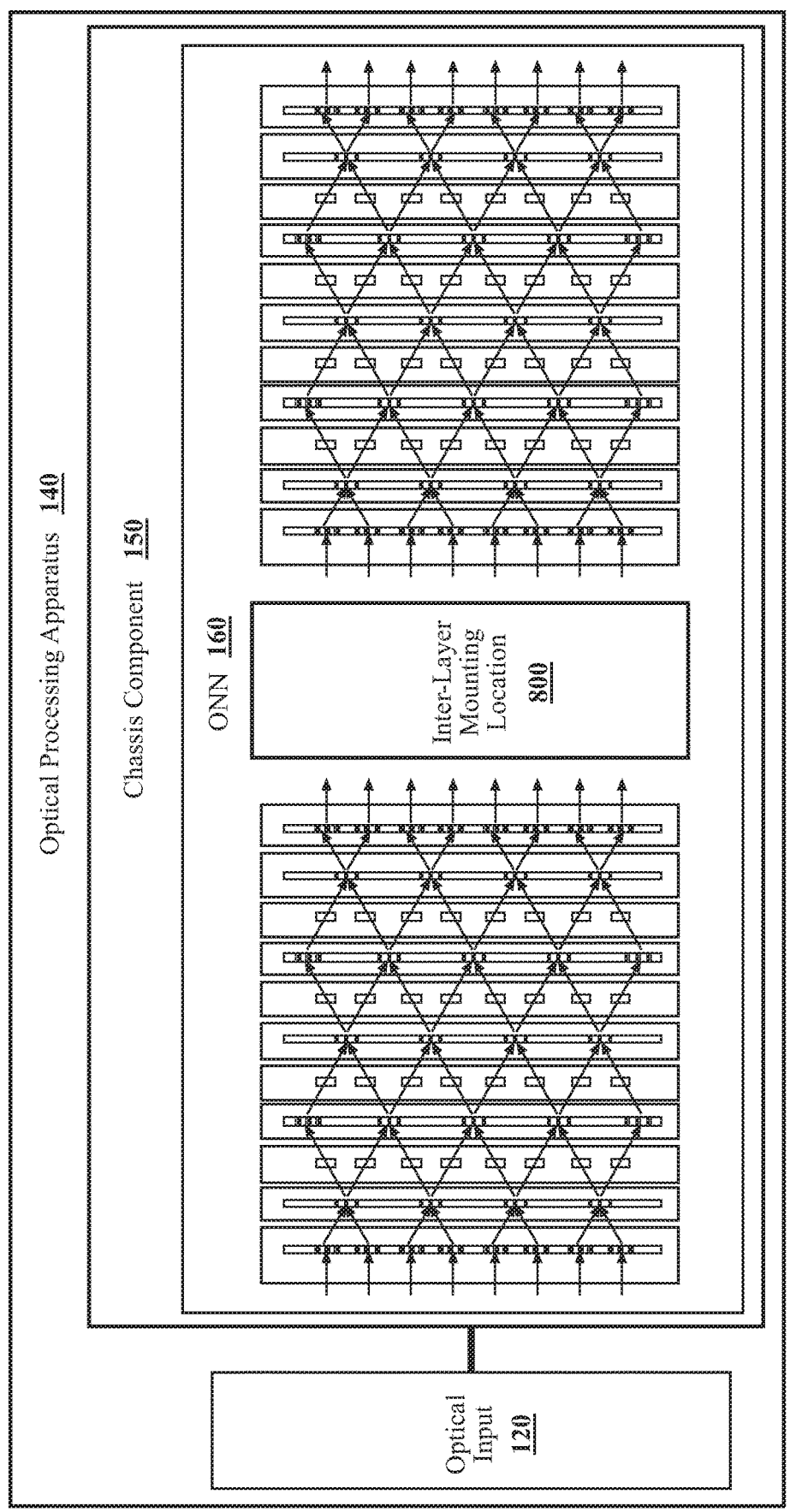
FIG. 8 illustrates another embodiment of a chassis component including an inter-layer mounting location.

FIG. 8 illustrates a further embodiment of the chassis component 150. As shown in FIG. 8, the chassis component 150 includes an inter-layer mounting location 800 that is disposed between layers of the ONN 160. The inter-layer mounting location 800 is generally of a similar form as the mounting locations 700, 710, and 720 but is provided between layers of the ONN 160. Of course, while the chassis component 150 is shown as including the singular mounting location 800, in further embodiments, the chassis component 150 includes multiple inter-layer mounting locations between separate layers of the ONN 160.

Moreover, the chassis component 150, in yet a further approach, includes the inter-layer mounting location 800 in combination with one or more other modular mounting locations (e.g., 700, 710, 720). In various approaches, the chassis component 150 is further configured to cooperatively use the modular mounting locations (e.g., location 710) in combination with the inter-layer mounting location 800. That is, for example, the inter-layer mounting location 800, in one approach, functions to redirect the optical signal 110 from between layers in the ONN 160 out to a separate mounting location (e.g., location 710) for processing by one or more modular network components mounted therein. The chassis component 150 may further reinject the optical signal 110 after processing by a component in location 710 back into the ONN 160. Thus, the modular mounting locations can function in combination to add further optical processing components such as additional neural networks layers while also repurposing existing layers of the ONN 160 to form a revised architecture that implements a significantly revised version of the deep learning algorithm.

As previously noted, in addition to implementing additional layers of an optical neural network, the mounting locations (e.g., 700 and 710) may also function to accept modular network components for performing pre and/or post-processing of the optical signal 110. For example, the modular network components may further include combinations of filters and/or other optical components to implement a transformation function for adapting the optical signal 110. In one embodiment, the modular network components function to act as a rectified linear unit (RELU) type of nonlinear activator. Thus, the modular network components can be inserted into any of 700, 710, 720, and 800 to form multi-system optical neural networks where nonlinear activation can be processed intermediately (e.g., RELU or another nonlinear activator). Other layer functionality can include logistic regression, activations, and loss functions.

Figure 9:
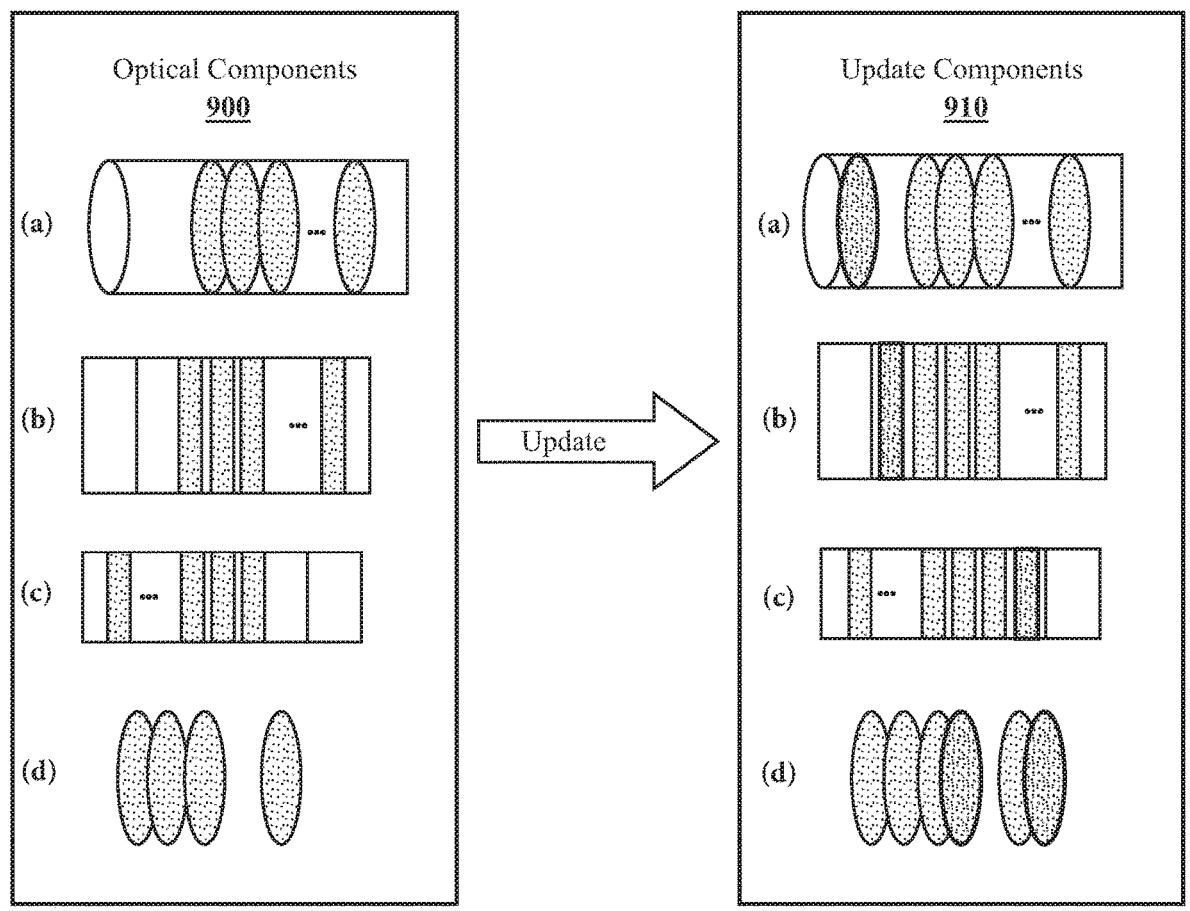
FIG. 9 illustrates an embodiment of a mounting location prior to and after the integration of modular networking components.

As an additional example of modular network components, consider FIG. 9. FIG. 9 illustrates multiple examples combinations of optical components 900 as may be originally provided within an ONN or within a modular mounting location of the chassis component 150. That is, even though the modular mounting locations are generally discussed as being empty/free space without any processing components, in one or more embodiments, the modular mounting locations may be initially populated with components such as optical components 900. The components 900 generally include optical fibers (a), silicon photonic-based layers of an ONN (b) and (c), and free-space optical components (d). Thus, the sets of components in 900 can be completely swapped out to upgrade the apparatus 100, or additional components can be added, as shown with updated components 910, where an update inserts additional optical components.

The chassis component 150 itself may also take different forms such as a physical case type of device, diffractive optical elements in the form of photonic crystals (PCs), metasurfaces, grating structures with waveplates, preconfigured mounts and supporting optical propagation means (e.g., fibers, waveguides, etc.). In one approach, the chassis component 150 or the separate mounting locations of the chassis component 150 take the form of a crystalline material that has optical components laser inscribed internally, a chassis/case that accepts sheets of metasurfaces, grating structures, and so on. As one example of a chassis component 150 that may support the ONN 160 and provide the modular mounting locations for selectively inserting additional modular network components, consider FIG. 10.

Figure 10:
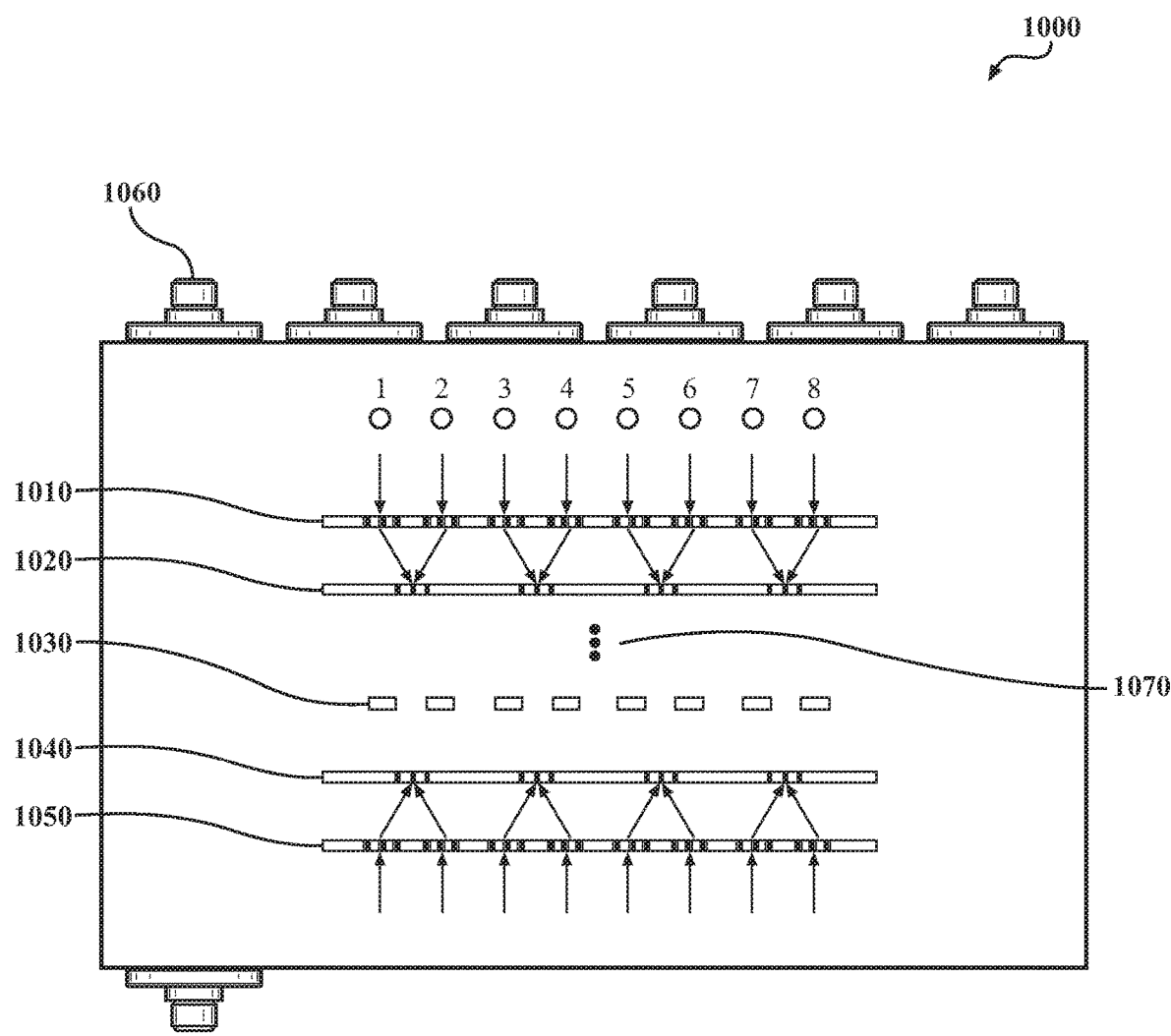
FIG. 10 is a diagram illustrating one embodiment of a chassis component.

FIG. 10 illustrates a chassis component 1000 that supports separate layers 1010, 1020, 1030, 1040, and 1050 of a neural network. The chassis 1000 further includes interfaces 1060 for interfacing with an optical relay (e.g., 130) and/or another input such as optical input 120. Moreover, the chassis 1000 further includes a modular mounting location 1070 between separate layers of the neural network layers illustrated in FIG. 10. In one embodiment, to ensure better injection efficiencies of the optical signal 100 into the photonic integrated circuits tapered waveguides are used as the inputs. The tapered waveguides, in one embodiment, have dimensions that maintain total internal reflection for the confined optical signal 110. This allows for better transitions from free-space/optical fiber to photonic integrated circuits. In one approach, the inputs utilize lenses when the optical signal 110 has a beam width larger than the waveguide. The waveguides may be tapered from an entrance port to a more tightly confined waveguide. In one approach, the effective dimension of the tapered waveguide changes from 50 microns at an input down to 10 microns across the waveguide.

Figure 11:
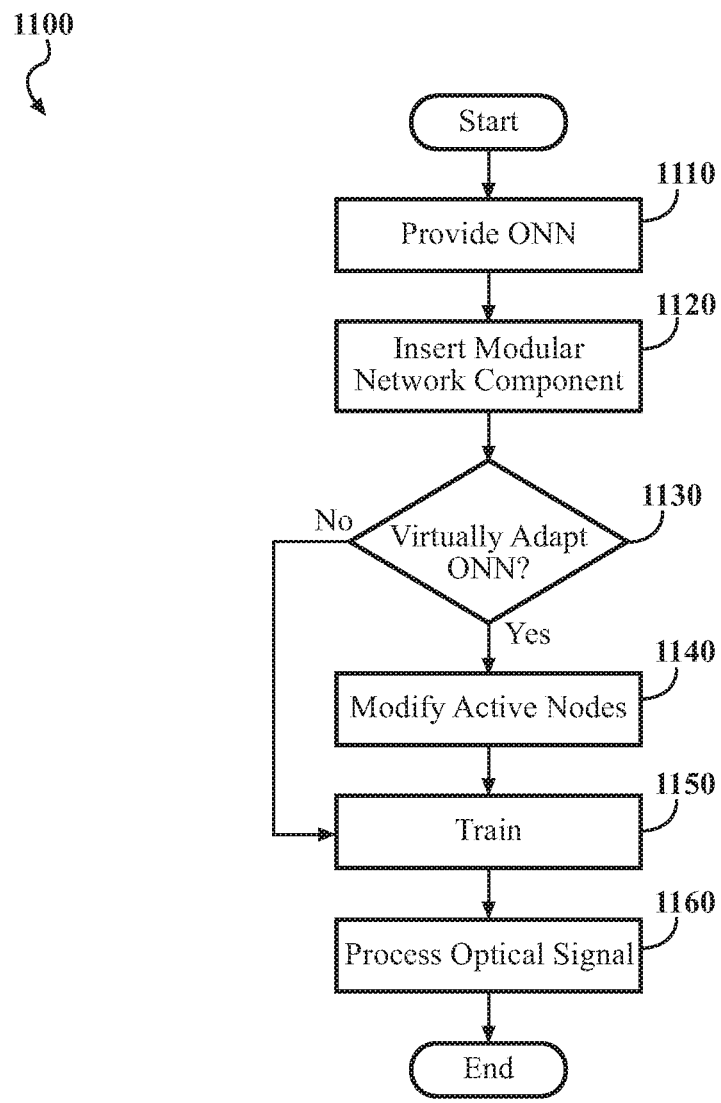
FIG. 11 is a flowchart illustrating one embodiment of a method associated with adapting an architecture of an optical neural network.

As a further explanation of how the disclosed photonic apparatus supports upgrades/updates after initial deployment, consider method 1100 of FIG. 11, which is associated with dynamically adapting an optical neural network. Method 1100 will generally be discussed from the perspective of electronic control circuitry that may be embedded as part of the photonic apparatus 100 of FIG. 1. However, it should be appreciated that the noted method is not limited to such an implementation but is discussed from the perspective of the identified components for purposes of clarity in this explanation.

At 1110, the optical neural network is initially provided for use as an integrated part of, for example, a LiDAR sensor, a data center server, or another computing component that is configured to provide an optical signal into the ONN. As previously described, the ONN initially implements a deep learning algorithm that provides for performing a task such as object detection, object classification, and so on. In one approach, providing the ONN includes mounting the ONN into a chassis and operably connecting the ONN with an optical input that provides the optical signal into the ONN.

Moreover, in a further aspect, providing the ONN can also include initializing the ONN by setting hyper-parameters for separate nodes with layers of the ONN. For example, the control circuitry may be initially loaded with the hyper-parameters values and may adjust phase shifters or another component within the ONN to set the separate nodes according to the hyper-parameters. In further approaches, the control circuitry may actively implement a supervised training routine to develop the hyper-parameters for the nodes. In either case, the control circuitry initially sets the parameters in order to prepare the ONN to process optical signals.

At 1120, after the ONN is originally provisioned and operating, a modular network component is inserted in the chassis to update the ONN. As previously explained, the modular network component and the manner in which the component is mounted into the chassis in relation to the ONN may vary according to a configuration of the ONN and the extent of the update. However, the insertion of the new component generally functions to alter the deep learning algorithm implemented by the ONN. Thus, whether the modular network component includes multiple additional network layers or a single component, the modular component adapts the ONN to form an updated network in relation to the original ONN. The updated ONN processes the optical signal according to an updated version of the deep learning algorithm to provide additional and/or different output results that may be used by, for example, the computing device 170.

At 1130, the control circuitry selectively adapts a structure of the original ONN. In one embodiment, the control circuitry receives additional instructions via, for example, the computing device 170 to induce the circuitry to adapt the ONN. In various approaches, the circuitry may virtually adapt the architecture of the ONN to, for example, better integrate with the added network components and/or to specifically implement a particular deep learning algorithm. In any case, if such a revision is undertaken according to an electronic signal received by the control circuitry, then the method proceeds to 1140; otherwise, the method proceeds to 1150.

At 1140, the control circuit virtually modifies a structure of the ONN. In one embodiment, the control circuit can control phase shifters and/or other active optical elements within the ONN. Thus, the control circuit, in one approach, selectively adjusts one or more nodes within the layers of the ONN to block transmission of the optical signal through the one or more nodes. By selectively controlling the nodes in this way, the control circuit adapts/adjusts a structure of the ONN to activate one or more nodes in the ONN selectively. Thus, while the structure of the existing ONN itself does not actually change, the control circuit can virtually adapt the architecture through the selective deactivation of various nodes in the ONN. In combination with adding modular network components to the chassis component, an overall architecture of the ONN can be significantly modified to implement a revised version of the deep learning algorithm that provides distinctive functionality than the original deep learning algorithm. Of course, while method 1100 is generally discussed as including the option of both the insertion of additional optical components and the virtual modification of the architecture of the ONN, it should be appreciated that both options may be used in combination or, in further embodiments, either option may be employed independently.

At 1150, the control circuit executes a training routine to train the updated optical neural network. In one embodiment, the control circuit implements a supervised learning process to train the optical neural network through the use of backpropagating values according to an assessed loss that is derived as a comparison of results of the ONN and known results for a set of a training data. In this way, the ONN is trained to perform the updated version of the deep learning algorithm and define hyper-parameters within the ONN and the modular network components.

At 1160, the optical neural network and newly configured aspects of the optical neural network (e.g., virtual modifications, newly inserted modular components) process the optical signal according to the revised version of the deep learning algorithm. Thus, the update network processes the optical signal to provide classification results of LiDAR data or other determinations of the information encoded within the optical signal. In this way, the photonic apparatus 100 can be adapted even though the originally included optical neural network 160 is embodied as a static hardware structure.

FIG. 1 will now be discussed in further detail as an example environment within which the system and methods disclosed herein may operate. The photonic apparatus 100 can include one or more processors. In one or more arrangements, the processor(s) can be a main processor of the photonic apparatus 100. For instance, the processor(s) can be an electronic control unit (ECU) embodying control circuitry. The photonic apparatus 100 can include one or more data stores for storing one or more types of data. The data store can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store can be a component of the processor(s), or the data store can be operably connected to the processor(s) for use thereby. The term "operably connected," as used throughout this description, can include direct or indirect connections, including connections without direct physical contact, electrical connections, optical connections, and so on.

The one or more data stores can include sensor data. In this context, "sensor data" refers to information produced by the photonic apparatus 100 from transmitting the beam of light and receiving responses thereto. As will be explained below, the photonic apparatus 100 can be a part of a sensor system of a vehicle or other device. The sensor system can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system includes a plurality of sensors (e.g., multiple LIDAR sensors), the sensors can function independently from each other. Alternatively, two or more of the sensors can work in combination with each other. In such a case, the two or more sensors can form a sensor network. The sensor system and/or the one or more sensors can be operably connected to the processor(s), the data store(s), and/or another element of the photonic apparatus 100 (including any of the elements shown in FIG. 1). The sensor system can acquire data of at least a portion of the external environment of the photonic apparatus 100 (e.g., nearby vehicles, obstacles).

As an example, in one or more arrangements, the sensor system can include one or more radar sensors, one or more LIDAR sensors, one or more sonar sensors, and/or one or more cameras. The processor(s) and/or associated modules (e.g., autonomous driving module) executing thereon can be operably connected to communicate with the various vehicle systems and/or individual components thereof. For example, the processor(s) can be in communication to send and/or receive information from the various vehicle systems to control the movement, speed, maneuvering, heading, direction, etc. of a vehicle. The processor(s), and/or the autonomous driving module(s) may control some or all of the systems of a vehicle and, thus, may be partially or fully autonomous.

The photonic apparatus 100 and/or associated computing device 170 can include one or more modules. The modules can be implemented as computer-readable program code that, when executed by a processor, implement one or more of the various processes described herein. One or more of the modules can be a component of the processor(s), or one or more of the modules can be executed on and/or distributed among other processing systems to which the processor(s) is operably connected. The modules can include instructions (e.g., program logic) executable by one or more processor(s). Alternatively, or in addition, one or more data stores may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An apparatus, comprising:
an optical input that provides an optical signal that is an analog light wave;
a chassis component including at least one modular mounting location for receiving a modular network component; and
an optical neural network (ONN) operably connected with the optical input, the ONN configured to perform optical processing on the optical signal according to a deep learning algorithm, wherein the ONN includes optical components arranged into layers to form a physical architecture of the ONN, wherein the optical input provides the optical signal into the ONN via an optical relay to maintain the optical signal as the analog light wave from acquisition into the ONN, and
wherein the modular network component being an additional optical processing component that is configured to function in cooperation with the ONN to adapt the deep learning algorithm by altering the physical architecture.

2. The apparatus of claim 1, further comprising:
a control circuit configured to virtually modify a structure of the ONN by selectively adjusting one or more nodes within the layers of the ONN to adjust transmission of the optical signal through the one or more nodes,
wherein the control circuit is configured to train the optical neural network by adjusting nodal weights within separate nodes of the layers in the ONN according to a training algorithm; and
wherein the modular network component alters the physical architecture by integrating the additional optical components that are physical components for performing optical processing on the analog light wave into the ONN.

3. The apparatus of claim 1, further comprising:
the modular network component mounted in the at least one modular mounting location, wherein the modular network component and the ONN function together to implement a revised version of the deep learning algorithm that is an alteration that is a physical rearrangement of the physical architecture.

4. The apparatus of claim 3, wherein the modular network component is mounted in the modular mounting location to intervene between the ONN and the optical input and receive the optical signal from the optical input prior to the ONN, and
wherein the modular network component provides a processed version of the optical signal to the ONN.

5. The apparatus of claim 3, wherein the modular network component is mounted in the modular mounting location to receive a processed signal from the ONN and to provide additional processing to refine a classification from the ONN according to the revised version of the deep learning algorithm.

6. The apparatus of claim 3, wherein the modular network component is mounted in the modular mounting location to receive the optical signal in parallel with the ONN and to provide an additional classification of the optical signal in cooperation with the ONN, and wherein the revised version of the deep learning algorithm including a first classification algorithm of the ONN and a second classification algorithm of the modular network component.

7. The apparatus of claim 3, wherein the chassis component supports the layers of the ONN and the at least one mounting location includes an internal mounting location between the layers of the ONN, and
wherein the modular network component is mounted to the internal mounting location to integrate the modular network component with the ONN forming the revised version of the deep learning algorithm to update the deep learning algorithm.

8. The apparatus of claim 3, wherein the modular network component includes an arrangement of optical components forming one or more layers of a neural network.

9. The apparatus of claim 3, wherein the modular network component is integrated with an optical processing component that is mounted in the chassis component to provide one of: pre-processing of the optical signal and post-processing of the optical signal, and
wherein the modular network component modifies a transformation of the optical processing component.

10. The apparatus of claim 1, wherein the optical input is connected with a source to receive the optical signal, the source including one of: an optical sensor and an optical network interface, the optical network interface providing the optical signal associated with a separate computing device, the optical sensor providing the optical signal as a direct observation of a surrounding environment, and
wherein the optical signal encodes information about the surrounding environment.

11. The apparatus of claim 1, wherein the ONN is comprised of:
a set of optical components forming the layers, the layers including alternating layers of optical grating couplers and phase shifters that are configured to process the optical signal according to the deep learning algorithm.

12. The apparatus of claim 1, wherein the ONN is comprised of one or more of:
a photonic integrated circuit (PIC),
a fiber optic bundle,
a set of optical gratings,
a set of optical free-space elements, and
an array of Mach-Zehnder interferometers including a set of phase shifters and a set of beam splitters.

13. An optical processing apparatus, comprising:
an optical input that provides an optical signal from an optical sensor that produces the optical signal as a direct observation of a surrounding environment, the optical signal being an analog light wave;
an optical neural network (ONN) operably connected with the optical input, the ONN configured to perform optical processing on the optical signal according to a deep learning algorithm, wherein the ONN includes optical components arranged into layers to form a physical architecture of the ONN, wherein the optical input provides the optical signal into the ONN via an optical relay to maintain the optical signal as the analog light wave from acquisition into the ONN;
a chassis component including at least one modular mounting location; and
a modular network component mounted in the at least one modular mounting location, wherein the modular network component and the ONN function together to implement a revised version of the deep learning algorithm by altering the physical architecture.

14. The optical processing apparatus of claim 13, further comprising:
a control circuit configured to virtually modify a structure of the ONN by selectively adjusting one or more nodes within the layers of the ONN to adjust transmission of the optical signal through the one or more nodes,
wherein the control circuit is configured to train the optical neural network by adjusting nodal weights within separate nodes of the layers in the ONN and in the modular network component according to a training algorithm.

15. The optical processing apparatus of claim 13, wherein the modular network component is selectively mounted in the at least one modular mounting location that is one of: prior to the ONN, in parallel with the ONN, after the ONN, and integrated between layers of the ONN.

16. The optical processing apparatus of claim 13, wherein the optical signal is from one of:
a light detection and ranging (LiDAR) sensor, and is conveyed from the LiDAR sensor to the ONN via an integrated optical pathway, and an optical network interface.

* * * * *

UNITED STATES PATENT AND TRADEMARK OFFICE
CERTIFICATE OF CORRECTION

PATENT NO. : 12,111,492 B2
APPLICATION NO. : 16/589603
DATED : October 8, 2024
INVENTOR(S) : Sean P. Rodrigues et al.

Page 1 of 1

It is certified that error appears in the above-identified patent and that said Letters Patent is hereby corrected as shown below:

In the Claims

Claim 2, Column 24, Line 39: Remove "the" between integrating and additional.

Signed and Sealed this
Seventh Day of January, 2025

Derrick Brent
*Acting Director of the United States Patent and Trademark Office*